United States Patent [19]

Sacks

[11] Patent Number: 5,714,983
[45] Date of Patent: Feb. 3, 1998

[54] INTERACTIVE COMPUTER SYSTEM WITH CONTROLLABLE RATE REPETITION OF COMPUTER ACTIONS IN RESPONSE TO OPERATOR INPUTS

[76] Inventor: Robert Sacks, 25-40 31st. Ave., Long Island City, N.Y. 11106-3629

[21] Appl. No.: 206,193

[22] Filed: Mar. 3, 1994

Related U.S. Application Data

[63] Continuation of Ser. No. 658,387, Feb. 20, 1991, abandoned.

[51] Int. Cl.$^6$ .................................................. G09B 5/00
[52] U.S. Cl. ......................................... 345/168; 341/22
[58] Field of Search ............................ 345/156, 157, 345/168, 173, 123, 124, 125, 7, 160; 395/155, 725; 341/22, 23, 20, 34

[56] References Cited

U.S. PATENT DOCUMENTS

| | | | |
|---|---|---|---|
| 3,863,098 | 1/1975 | Mehr | 315/367 |
| 4,148,014 | 4/1979 | Burson | 340/709 |
| 4,313,113 | 1/1982 | Thornburg | 340/709 |
| 4,323,888 | 4/1982 | Cole | 341/34 |
| 4,552,360 | 11/1985 | Bromley et al. | 273/85 G |
| 4,647,916 | 3/1987 | Boughton | 340/724 |
| 4,691,200 | 9/1987 | Stephany | 340/784 |
| 4,698,626 | 10/1987 | Sato et al. | 340/710 |
| 4,734,685 | 3/1988 | Watanabe | 340/710 |
| 4,766,423 | 8/1988 | Ono et al. | 340/709 |
| 4,949,248 | 8/1990 | Caro | 395/725 |
| 5,041,819 | 8/1991 | Takeda | 345/168 |
| 5,124,689 | 6/1992 | Franz et al. | 340/706 |

OTHER PUBLICATIONS

Van Wolverton, "MS DOS", version 4, 1984, p. 113.
"Repeat Performance", 21-page instruction manual, by Kevin M. Crenshaw and Popular Demand, Inc., WordPerfect Corporation 1989.
R.W. Truelson, "Single-Key Cursor Control", IBM Technical Disclosure Bulletin, vol. 26, No. 7B, Dec. 1983.

*Primary Examiner*—Xiao Wu
*Attorney, Agent, or Firm*—Brumbaugh, Graves, Donohue & Raymond

[57] ABSTRACT

Improved control of repeated program response to a user input is provided. One user input, such as the pressing and releasing of a key, causes a corresponding program response. Pressing of the key for longer than a predetermined interval causes a repetition of the response at a particular rate. Pressing of a second key while the repetition occurs causes the repetition to occur at a different rate. The improved control is possible independently of software and independently of motherboard hardware.

66 Claims, 23 Drawing Sheets

INTERACTIVE COMPUTER SYSTEM WITH CONTROLLABLE RATE REPETITION OF COMPUTER ACTIONS IN RESPONSE TO OPERATOR INPUTS

This application is a continuation of application Ser. No. 07/658,387, filed on Feb. 20, 1991, now abandoned.

BACKGROUND OF THE INVENTION

The present invention relates to interactive computer systems of the type in which the program being executed receives and responds to operator actions, and, more particularly, to interactive computer systems in which repetition of computer response to an operator input can occur in a manner such that the rate of repetition may be varied by the operator.

Interactive computer systems which are designed to enable an operator to interact with a program being executed in the computer are well known and in widespread use. Such computers are generally provided with one or more input devices, e.g., a keyboard, a "mouse", or a touch screen, for receiving an operator action, and a display device, e.g., a CRT monitor, for presenting the operator with messages, data or other visual prompts or indicia from the program, such as requests for particular operator actions or the program's response to an action by the operator.

In many interactive computing applications, for example word processing, certain operator inputs such as those giving rise to movement of a cursor or scrolling of text on a display screen are frequently repeated. The repetition of operator input may be accomplished by repeated actuations of an appropriate key on the keyboard. However, such repeated actuations of a key tends to be time consuming and consequently reduces the productivity of an operator.

One known technique for providing the repetition of a computer response to an operator input is to adapt the computer through hardware or software to repeatedly provide a key value corresponding to the depression of a key on the keyboard for so long as that key is depressed. Another known technique for providing such repetition is to provide the keyboard with a "repeat key" which when depressed simultaneously with another key on the keyboard causes key values corresponding to the latter key to be repeatedly provided to the program being executed in the computer for so long as both keys are depressed.

The foregoing prior art techniques for providing repetition have the drawbacks of being limited to operator actions entered through a keyboard and not through some other input device, such as a touch screen. More importantly, the rate at which the computer repeats actions in response to operator inputs entered through a keyboard is preset and cannot be varied at the time such inputs are entered. In many instances, it is desirable to control the rate at which a computer repeats its response to an operator input at the time such input is entered. For example, where the position of a cursor is to be moved from an initial position to a desired position on the display screen of the computer, it is advantageous to repeat the computer's response to operator depressions of appropriate cursor movement keys on the keyboard at a relatively fast rate until the cursor is close to the desired position on the screen and then to change the rate of repetition to a relatively slow rate to avoid overshooting the desired cursor position.

SUMMARY OF THE INVENTION

The foregoing drawbacks of the prior art are substantially removed by the present invention which is an interactive computer system comprising a processor, a memory for storing program and data for the processor, a keyboard having a plurality of character and special keys, a keyboard interface for coupling the keyboard to the processor, and a display for providing messages, data and other visual prompts or indicia to an operator. The keyboard interface, which is a combination of hardware and software, includes first means responsive to a momentary depression of one of the keys on the keyboard for causing the program to perform an action corresponding to the depressed key during execution of the program by the processor. Further, the keyboard interface includes second means responsive to the prolonged depression of one of the keys of the keyboard for causing the processor to repetitively perform at a first repetition rate the action corresponding to the key being depressed during execution of the program by the processor. In addition, the keyboard interface also includes third means responsive to a prolonged depression of one of the keys of the keyboard and subsequent concurrent prolonged depression of a different key of the keyboard for repetitively causing the processor to perform at a second repetition rate the action corresponding to the first depressed key for so long as the two keys remain depressed. If the subsequently depressed key is released while the first depressed key remains depressed, the repetition rate of action corresponding to the first depressed key received by processor changes to the first rate. If the first depressed key is released, repetition of action corresponding to that key stops, even if the subsequently depressed key remains depressed.

The first, second and third means of the keyboard interface may be implemented through a terminate-and-stay-resident (TSR) program co-resident in the memory with an interactive program used by an operator. In another embodiment of the invention, the first, second and third means of the keyboard interface are implemented through BIOS routines in the ROM of a commercially available personal computer. In a further embodiment of the invention, the first, second and third means are implemented through routines added to an application program of the computer system. In a still further embodiment of the invention, the first, second and third means are implemented entirely in the hardware and/or software of the keyboard.

BRIEF DESCRIPTION OF THE DRAWINGS

The present invention may be better understood with reference to the following detailed description of the exemplary embodiments, taken in conjunction with the accompanying drawings, in which.

Throughout the figures of the drawings, the same reference numerals and characters are used to denote like features, elements, and components of the illustrated apparatus.

DETAILED DESCRIPTION OF THE PREFERRED EMBODIMENT

The exemplary embodiments of the present invention are described with reference to hardware components which are included in the commercially available AT personal computer formerly manufactured by the International Business Machines Corporation. The principal hardware components of such a computer are the central processing unit (CPU), a RAM memory, a ROM memory, a keyboard and keyboard interface, and a video display and display interface. Stored in a portion of the ROM are the Basic Input/Output System (BIOS) which includes built-in interrupt service routines. The RAM which stores program and data for the CPU has a portion which is allocated for use by the BIOS routines (BIOS RAM area).

A detailed description of the BIOS of the AT personal computer may be found in the book entitled *The New Peter Norton Programmer's Guide to The IBM PC & PS/2*, by Peter Norton and Richard Wilton, Microsoft Press, second edition 1988, and in the book entitled *Inside the IBM PC, Revised and Enlarged*, by Peter Norton, Simon & Schuster, 1986.

Figure 1:
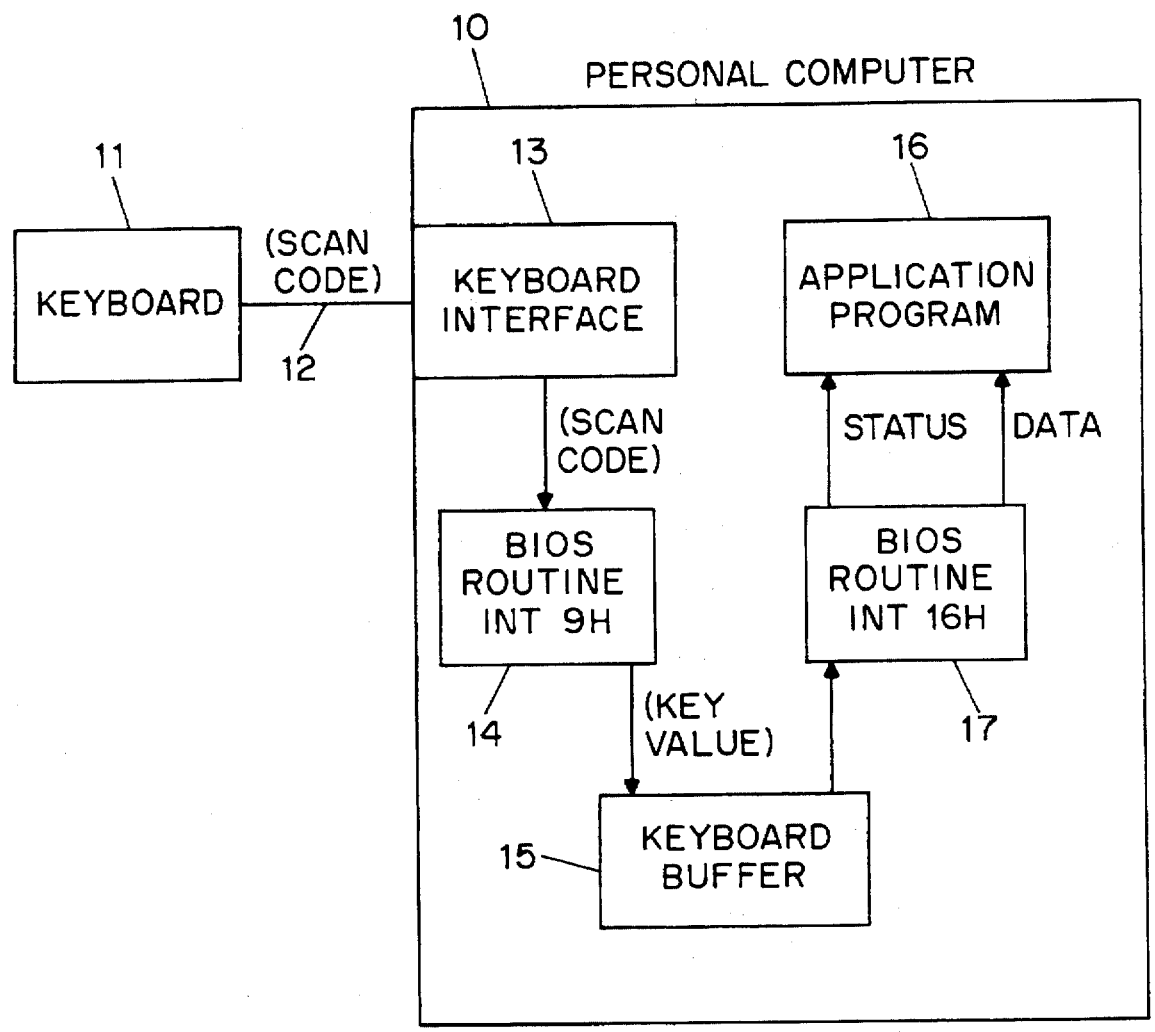
FIG. 1 shows the data flow associated with the keyboard in a conventional personal computer.

Referring now to FIG. 1 there is shown a diagram illustrating the data flow in the AT personal computer 10 relating to the operation of the keyboard 11. The pressing of a key of the keyboard 11 causes the generation of a scan code corresponding to the depression of the key. The scan code is transmitted by a serial synchronous data line 12 to a keyboard interface 13 in the computer 10. Release of the depressed key causes the generation of a different scan code corresponding to the release of the key.

The scan codes which are generated upon depression and upon release of the same key are related in that the release scan code is greater than the depression scan code by 128 (decimal).

The receipt of a scan code by the keyboard interface 13 causes an interrupt 9H to be provided to the CPU (not shown in FIG. 1). Ordinarily, receipt of interrupt 9H by the CPU results in the execution of BIOS routine 14. Execution of this routine 14 causes an examination of the scan code received by the keyboard interface 13 to determine whether the received scan code is a shift key (SHIFT, CTRL, or ALT), a toggle key (Num Lock or Caps Lock), a character key, or a function key. If the received scan code corresponds to a shift key or a toggle key, appropriate status information is stored in the BIOS RAM area. If the received scan code corresponds to a character or a function key, a corresponding key value is derived, taking into account the status information, and stored in a keyboard buffer 15 in the BIOS RAM area.

In the event that the program 16 being executed by the CPU requires input from the keyboard 11, interrupt 16H is normally invoked. In handling interrupt 16H, the CPU executes BIOS routine 17. Depending on the subservice value stored in CPU register AH (not shown in FIG. 1) by the program 16 prior to invocation interrupt 16H, BIOS routine 17 can provide to the program 16 the status of the keyboard buffer 15, and/or the next key value from the keyboard buffer 15.

The circuitry in the keyboard 11 is designed such that if a key is depressed for longer than a certain interval, typically half a second, the scan code corresponding to the depression of the key will be repeatedly generated at a predetermined rate and provided to the keyboard interface 13. Upon release of the depressed key, the repeated generation of scan codes will cease, and the scan code corresponding to the release of the depressed key will be generated and sent to the keyboard interface 13. In some personal computers the half-second interval before scan code repetition begins and the scan code repetition rate may be adjusted by the user by executing a special program.

When scan codes associated with a repeated key are received by the keyboard interface 13, the BIOS routine 14 responds by placing additional copies of the associated key value in the keyboard buffer 15. Repeated generation of scan codes in the manner described effectively simulates repeated key stroke action by an operator and is transparent to the program 16 in that it is unaware of whether the key values retrieved through BIOS routine 17 were caused by an operator repeatedly pressing and releasing a key or by the operator pressing a key and holding it down long enough to cause repeated generation of corresponding scan codes.

Interrupt Vectors

Although the BIOS is stored in a portion of the ROM, and therefore cannot be easily changed, the design of the BIOS is such that its functions may be bypassed or augmented. Upon receipt of the keyboard interrupt, the CPU refers to a location in what is called the interrupt vector area 20 in RAM, shown in the memory map of FIG. 2A. The contents of a four-byte region starting at 0:24H in the interrupt vector area 20 are used by the CPU as the argument of a subroutine call. Unless changed since initialization upon power-up, the contents of that region direct the CPU to the BIOS routine 17.

Similarly, when a program requests a key value by invoking interrupt 16H, the CPU uses the contents of a four-byte region starting at 0:58H in the interrupt vector area 20 as the argument of a subroutine call. Unless changed since initialization upon power-up, the contents of that region direct the CPU to the interrupt 16H routine in the BIOS ROM 21.

Figure 2A:
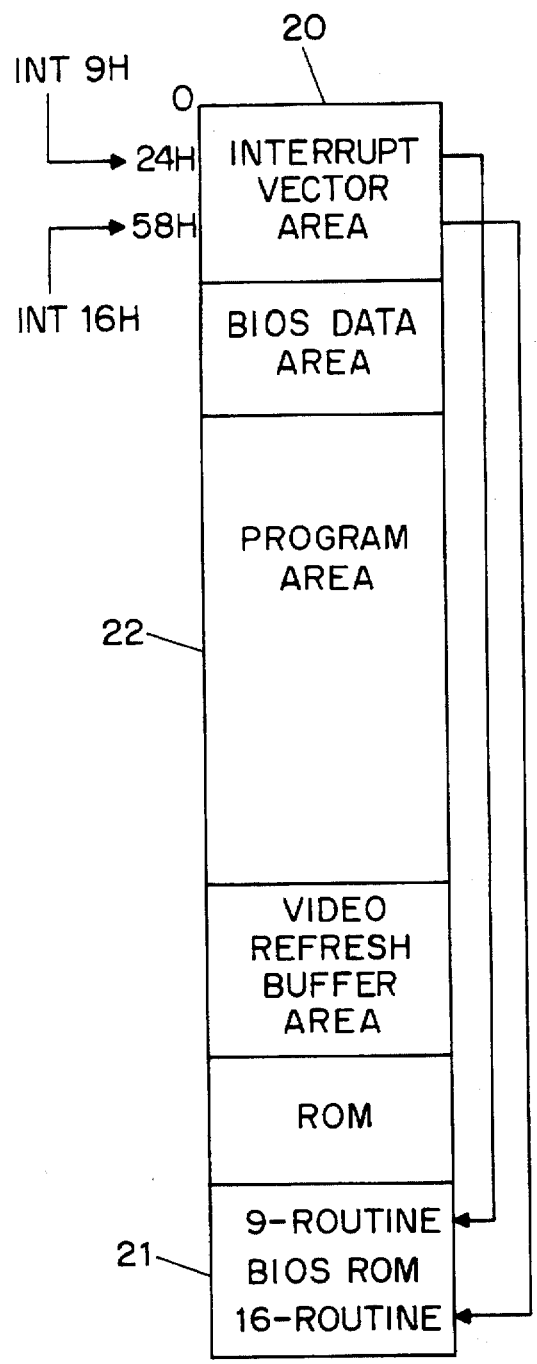
FIG. 2A shows the memory map of the personal computer of FIG. 1.
Figure 2B:
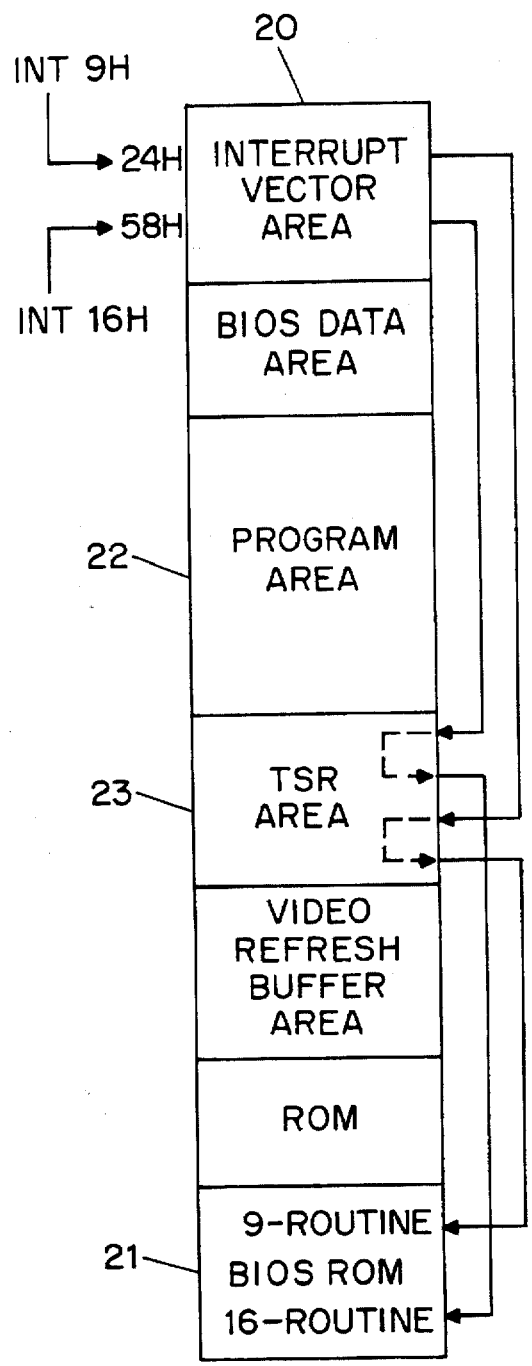
FIG. 2B shows the memory map of a personal computer according to a TSR embodiment of the invention.

Turning now to FIG. 2B, there is shown a memory map of the computer after a terminate-and-stay-resident (TSR) program according to one embodiment of the present invention is loaded into a portion of the RAM. The TSR program resides in a partitioned area 23 of the program area 22. The contents of the aforementioned portions of the interrupt vector area 20, namely those aforementioned regions having to do with CPU interrupts 9H and 16H, are modified to contain values that point to predetermined locations in the TSR area 23. The previous contents of those regions are copied into other predetermined locations in the TSR area 23.

Figure 3:
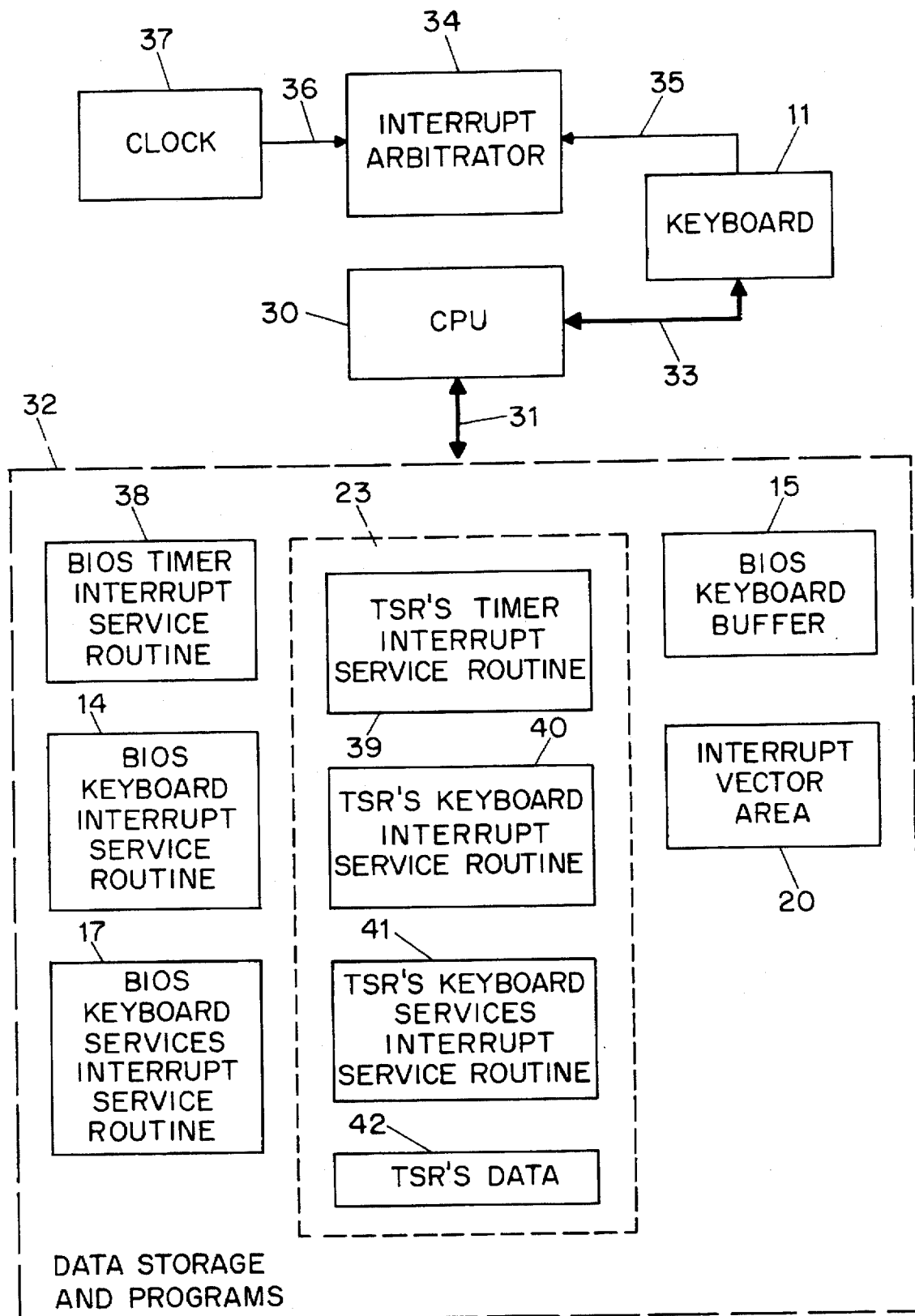
FIG. 3 shows a functional block diagram of a personal computer according to a TSR embodiment of the invention installed.

Referring to FIG. 3, there is shown a block diagram illustrating some of the hardware components of the personal computer. The CPU 30 has access via data bus 31 to memory 32. Memory 32 includes the RAM and ROM of the computer, whose memory map is depicted in FIGS. 2A and 2B. The CPU 30 is interfaced to keyboard 11 through data path 33, which includes but does not explicitly show the serial synchronous data line 12 and keyboard interface 13 shown in FIG. 1.

Hardware Interrupts

The personal computer of FIG. 3 is designed so that any of several hardware interrupts may be received by interrupt arbitrator 34. These hardware interrupts include a scan code arrival interrupt 35 generated by the keyboard interface 13 when a scan code has arrived on the serial synchronous data line 12, and a periodic interrupt 36 from a programmable clock 37. Arbitrator 34 prioritizes the hardware interrupts and makes them selectively available to CPU 30. The normal frequency of the periodic interrupt 36 is about 18 Hertz.

The design of the CPU 30 is such that its behavior upon receipt of an interrupt differs according to the particular interrupt that has arrived. As mentioned above in connection with FIG. 2A, the keyboard interrupt causes the CPU 30 to use the contents of memory at 0:24H as the argument of a subroutine call to handle the condition that gave rise to the interrupt. The periodic interrupt 36 causes the CPU 30 to use the contents of memory at 0:20H as the argument of the subroutine call. Memory locations 0:20H and 0:24H are both in the interrupt vector area 20.

Software Interrupts

The design of the CPU 30 further provides for so-called "software" interrupts. The instruction set of the CPU includes certain instructions which, if encountered during the routine fetching and executing of instructions, cause the CPU 30 to behave as it would have if a hardware interrupt had been received. One such opcode is the INT 16H opcode, which prompts the CPU 30 to use the contents of memory at 0:58H as the argument of a subroutine call. It is this opcode which is conventionally is executed by a program when it requests a key value to be entered from the keyboard. Memory location 0:58H is likewise in the interrupt vector area 20. It is noted that the interrupt arbitrator 34 is not used in connection with software interrupts.

Also shown in FIG. 3 are some of the contents of memory 32 (the ROM and RAM), including the abovementioned interrupt vector area 20, the keyboard buffer area 15, the INT 9H BIOS routine 14 (also called the keyboard interrupt service routine), and the INT 16H BIOS routine 17 (also called keyboard services interrupt service routine). FIG. 3 also shows the routine 38 which is executed in response to the periodic interrupt 36. BIOS routines 14, 17, and 38 all reside within the BIOS ROM area shown in FIGS. 2A and 2B.

Installing the TSR

Figure 4:
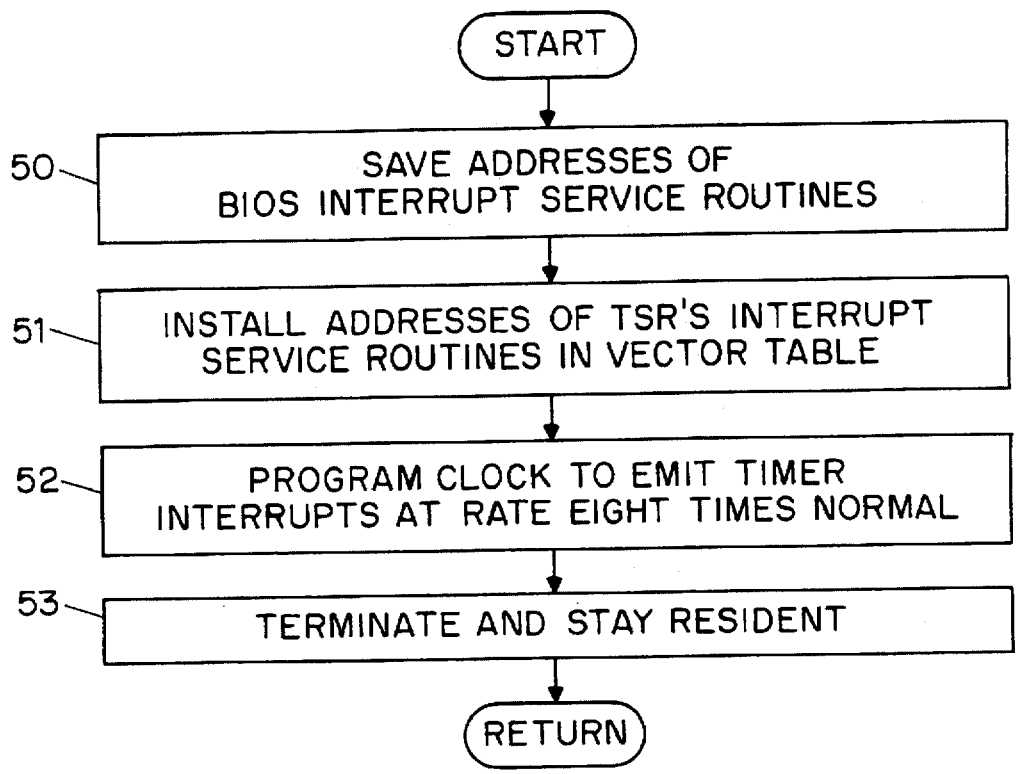
FIG. 4 is a flowchart of the software related to initial loading of a TSR program in accordance with a TSR embodiment of the invention.

FIG. 4 shows the flowchart representing a routine for installing the TSR program in the computer. Once installed, the TSR program occupies part of RAM, as shown in FIG. 2B. In block 50, the program copies the values at RAM locations 0:20H, 0:24H, and 0:58H into a selected area in the part of RAM where the TSR resides. In block 51, the program puts other values into those RAM locations, namely the addresses of the TSR's routines that are designed to augment the built-in BIOS ROM routines for those three interrupts. For reasons that will be described later, it is advantageous to reprogram the programmable clock 37 so as generate the periodic interrupt 36 eight times more often, or about 144 Hertz. Finally, in block 53 the program invokes a dish operating system (DOS) feature that returns control to DOS, but keeps the TSR program area protected against overwriting by other programs. This DOS feature for IBM compatible personal computers is well known to those skilled in the art of computer programming.

Once the TSR program is loaded, repetition of operator actions as entered through the keyboard may be controlled according to the invention, by internal processing as further explained below. If a key is held down long enough to repeatedly generate corresponding key values, then pressing of a second key will alter the repeat rate. The control of the repeat capability is available at the DOS prompt and within all application programs executed by the computer. Such application programs can be "off-the-shelf" and need not have been specially modified to provide control of the repeat capability in accordance with the invention.

FIGS. 5, 6A, 6B, 6C, 6D and 7 are flowcharts representing portions of the TSR program according to the present invention, and will be discussed in turn.

Timer Interrupts

Figure 5:
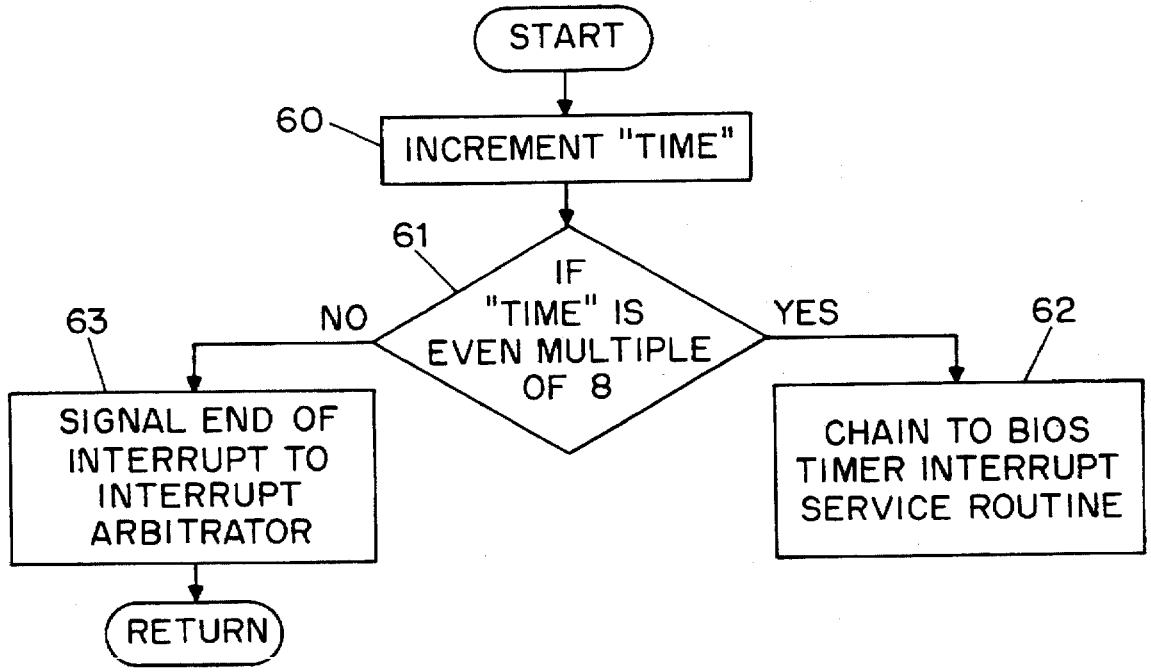
FIG. 5 is a flowchart of the software related to the handling of hardware "ticks" in accordance with a TSR embodiment of the invention.

Absent the TSR program, receipt by the CPU 30 of the periodic interrupt 36 gives rise to execution of the BIOS timer interrupt service routine 38. With the TSR in place, however, receipt of the periodic interrupt 36 causes the CPU 30 to execute the timer interrupt service routine 39 of FIG. 3, which is depicted in the flowchart of FIG. 5. In block 60, a variable internal to the TSR program called "TIME" is incremented. TIME and the other internal variables of the TSR reside in a TSR data area 42 shown in FIG. 3. In block 61, a test is made to determine if TIME is an even multiple of 8. The TSR passes control, in block 62, to the BIOS timer interrupt routine 38.

As noted above, the periodic interrupt 36 was made to arrive eight times more often. If the normal BIOS timer interrupt routine 38 were to be executed eight times too often, there would be a variety of unwanted effects. The purpose of the multiple-of-8 test is to determine how often the TSR timer interrupt routine 39 will pass control to the BIOS timer interrupt routine 38, and the result is that the BIOS timer interrupt routine 38 is called as often as it would be if the TSR program were absent.

If the value of TIME is not a multiple of 8, then the TSR routine makes an orderly termination through block 63, and the CPU 30 returns from the subroutine call of the periodic interrupt 36.

Handling Arrived Scan Codes

Absent the TSR, as described above, the arrival of a scan code from the keyboard 11 generates a hardware interrupt 35, which prompts execution of a BIOS routine 14. With the TSR installed, handling of an arrived scan code is different, as shown in detail in the flowchart of FIGS. 6A, 6B, 6C, and 6D.

The Routine of FIGS. 6A, 6B, 6C, and 6D

As described above, the arrival of a scan code generates an interrupt 9H, which prompts the CPU 30 to execute starting at the address stored in 0:24H. But the TSR placed a different address at 0:24H, namely an address pointing to the TSR's own scan code handling routine 40. It is this routine 40 that is shown in FIGS. 6A, 6B, 6C, and 6D. At block 70, a FERTILE CODE FLAG is cleared (set equal to zero) and the scan code value is obtained from the keyboard port of keyboard interface 13. At block 71, the just-received scan code value is compared with the previously obtained scan code value. If they are identical, this means that they must have been generated as a result of the hardware repeat feature of the keyboard, as described above.

The TSR is designed to provide repeat key action of its own, in place of the repeat key action of the standard keyboard. Thus, all but the first of several identical scan codes need to be discarded before they can be read by any program that requests a key value from the BIOS routine 17. To make this happen, a FLUSH KEY BUFFER flag is set (set to a nonzero value), as in block 72.

In the more likely case that the received scan code differs from the previous scan code, then control passes to block 73. As mentioned above, a release scan code is 128 bigger than a press scan code. The press scan code values are all under 128, so the release scan codes have values from 128 to 255. In block 73, the high-order bit of the scan code (which is 1 if the scan code is in the range 128 to 255) is tested. If set, the scan code was the release of a key, and control passes to block 74, where the current time and scan code (with the high bit cut off) are saved.

Among the variables in the TSR data area 42 is an array PRESSCODES, which contains in its first position the scan code of the key that was pressed, in its second position the scan code of the second key (if any) that was pressed while the first key was still held down, and so on. Another TSR variable is REPEAT RATE, which is zero if no key value is repeating, 1 if a key value is repeating, 2 if a key value is repeating faster because a second key had been pressed while the first was repeating, and so on. The value of REPEAT RATE, then, is a pointer into the PRESSCODES array, pointing to the scan code of the key that gave rise to that level of repeating.

If REPEAT RATE is zero, then no repetition is in progress and control passes to A3. If repetition is in progress, control passes to block 76, where a test is made to see if the scan code just received represents the release of the key that initiated the repetition. If so, then the repeat rate is set equal to 0 in block 77. Blocks 78, and 79 through 83 shown in FIG. 6B, determine whether the scan code just received represents that some key other than the repeating key has been released, and if so REPEAT RATE is decremented.

Figure 6A:
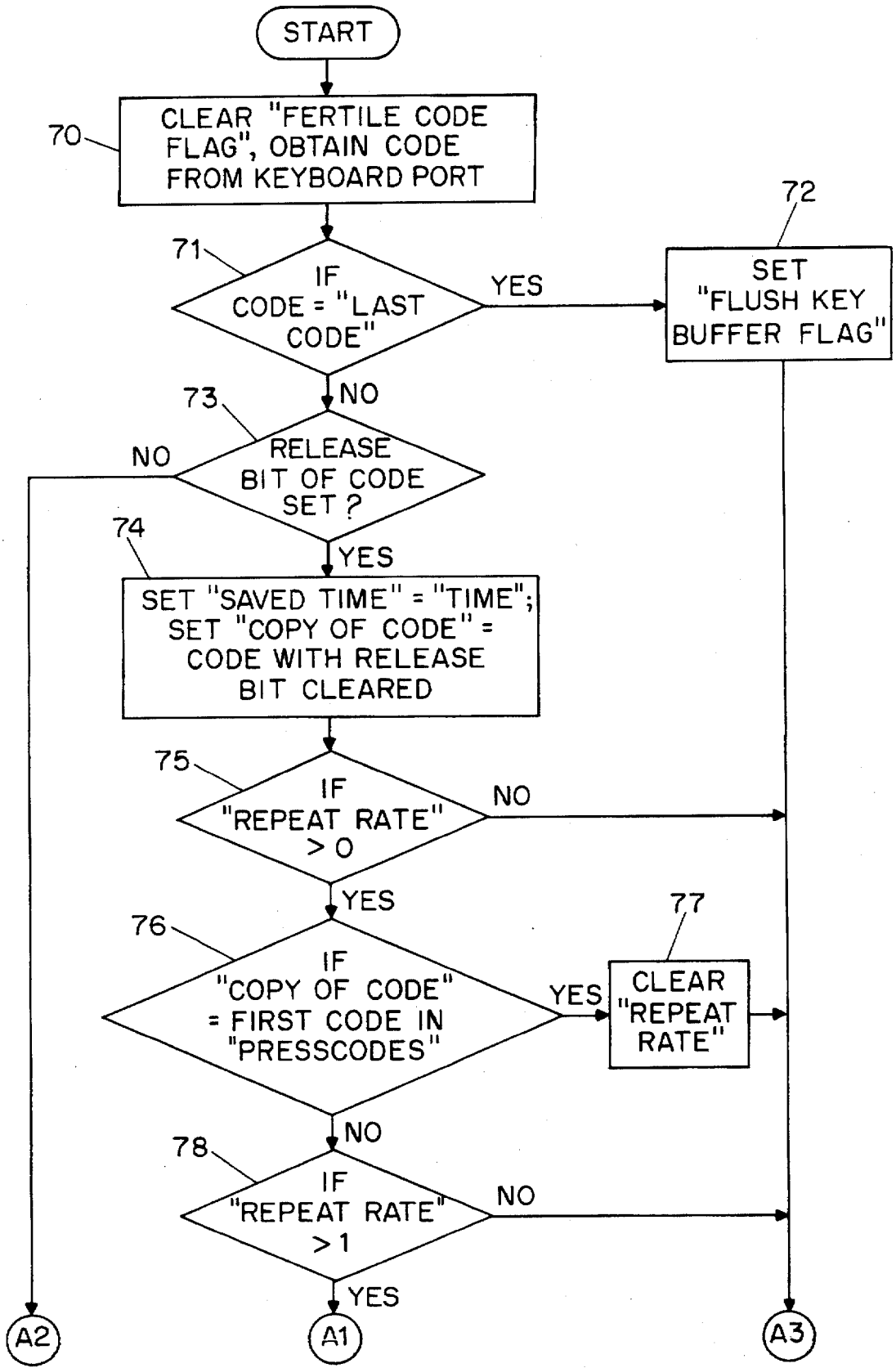
FIGS. 6A, 6B, 6C, and 6D are different portions of a flowchart of the program segment related to the handling of the arrival of a scancode from the keyboard in accordance with a TSR embodiment of the invention.
Figure 6B:
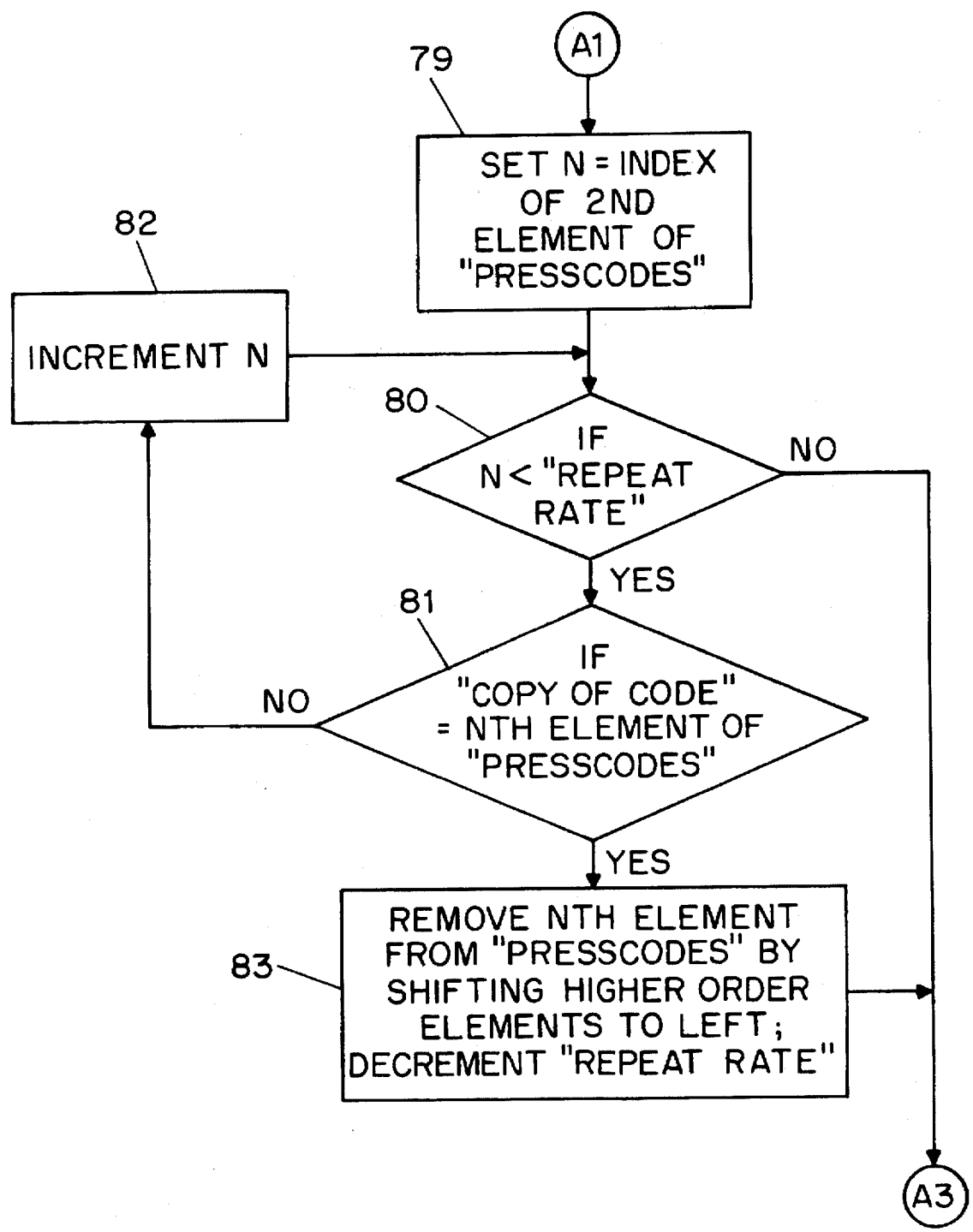
Figure 6C:
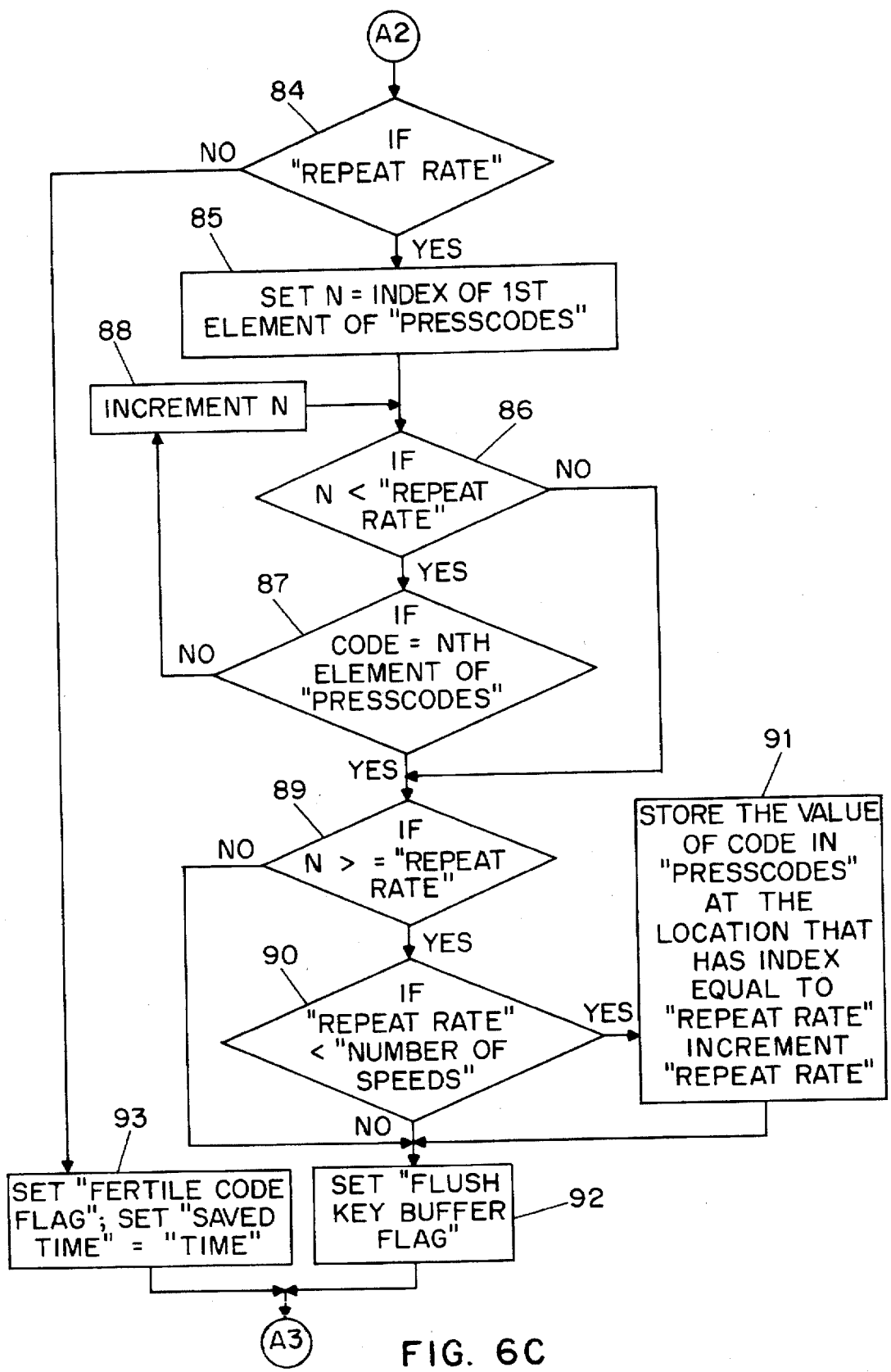

FIG. 6C shows blocks 84 through 93, which handle the possibility that the scan code just received represents a key that has just been pressed in addition to a key that gave rise to repetition and thus should give rise to an incrementing of REPEAT RATE. If so, REPEAT RATE is incremented in block 91. A test is made at block 90 to see whether incrementing REPEAT RATE would give rise to a REPEAT RATE value higher than that of the highest-numbered rate supported by the program, in which case the incrementing is not performed. For example, suppose the maximum number of supported repeat rates is 12. Then the test at 90 will come out "NO" if a first key had been held down to cause repeating, and if subsequently concurrently twelve more keys were pressed.

In any event, the key depressions other than the first need to be discarded so that they are not interpreted as key values in the keyboard buffer 15; this is done in block 92.

Figure 6D:
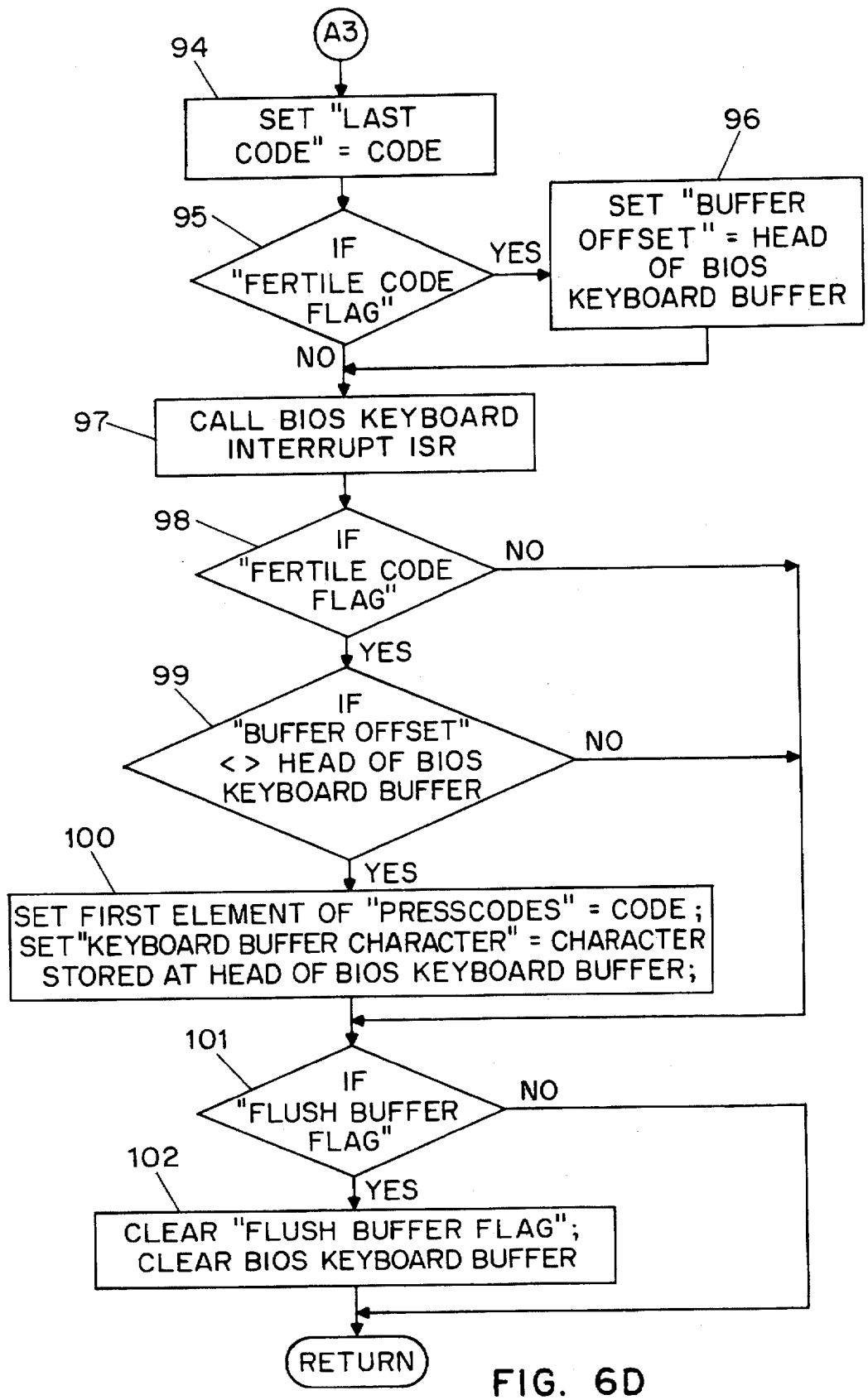

FIG. 6D shows the steps that are required for the TSR program to set up the contents of the keyboard buffer 15 so that later, when a program requests a key value from BIOS routine 17, the information provided to the program by the TSR program will be correct whether or not repeating is taking place. At block 94, the value of the current scan code is saved in a TSR variable LAST CODE to permit the above-described tests that use that variable.

At 95, the FERTILE CODE FLAG is tested. As noted above, this flag is set if a key was pressed at a time when no repetition due to continuous depression of a key was taking place. If FERTILE CODE is set, a received scan code is converted to a key value.

However, it should be noted that not every scan code gives rise to a key value. For example, pressing a SHIFT key by itself does not give rise to a key value. Since the keys of the keyboard may have been redefined by the user or a program, BIOS keyboard interrupt routine 14 is called to handle the received scan code as if the scan code had come in from the keyboard (shown in block 97).

The TSR program then determines whether the BIOS keyboard interrupt routine 14 placed a new key value in the keyboard buffer 15 by comparing the buffer status found at block 96 with the buffer status found at block 99. If such comparison shows that the keyboard buffer 15 has changed in size (i.e. the received scan code corresponds to a key value), the key value corresponding to the received scan code is stored in case it is later needed for repeated generation of that key value (block 100). If the keyboard buffer 15 has not changed in size, the BIOS keyboard interrupt routine 14 has not generated a key value from the received scan code.

In block 101, the FLUSH BUFFER FLAG is tested. If the FLUSH BUFFER FLAG is set indicating that the buffer is to be flushed, the TSR program repeatedly calls the BIOS keyboard service routine 17, and discards each key value that is returned, until the keyboard buffer 15 is empty. Control then returns to program execution from the point before the scan code was received.

Summary of the Routine of FIGS. 6A, 6B, 6C and 6D

In summary the routine of FIGS. 6A, 6B, 6C and 6D, studies a received scan code. If the received scan code pertains to the repeat rate (e.g., a second or third key has been pressed or released while repeating was in progress), any key value associated with the scan code is disregarded. It is only necessary to remember the scan code so that if the second or third key is released, the scan code generated by such release can be related to the initial depression scan code to return the repeat rate to its previous value. Scan codes pertaining to the repeat rate are stored in the PRESSCODES array located in the data area of the TSR.

If no repeating is taking place at the time a scan code is received, the key value associated with the received scan code is saved for later use by the program. The saved key value may also be used by the TSR program for subsequent repetition. The BIOS scan code handling routine 17 is used to determine the key value corresponding to the received scan code. Finally, a variable SAVED TIME, which will permit calculation of how long the key associated with the received scan code was depressed, is generated and saved. If the key has been held down for longer than a predetermined interval, repeating is initiated.

The routine of FIGS. 6A, 6B, 6C, and 6D shows that any repeating by the keyboard hardware is diverted by the TSR program and scan codes generated by such repeating are never provided to the application program or DOS. Furthermore, it is also interesting to note that the routine of FIGS. 6A, 6B, 6C, and 6D does not actually perform any repeating. It merely determines whether repeating is appropriate and, if so, whether the repeating should occur at a first rate, a second rate, or some other rate. It is left to the routine of FIGS. 7A and 7B to bring about the response to repetition by the application program or DOS.

Figure 7A:
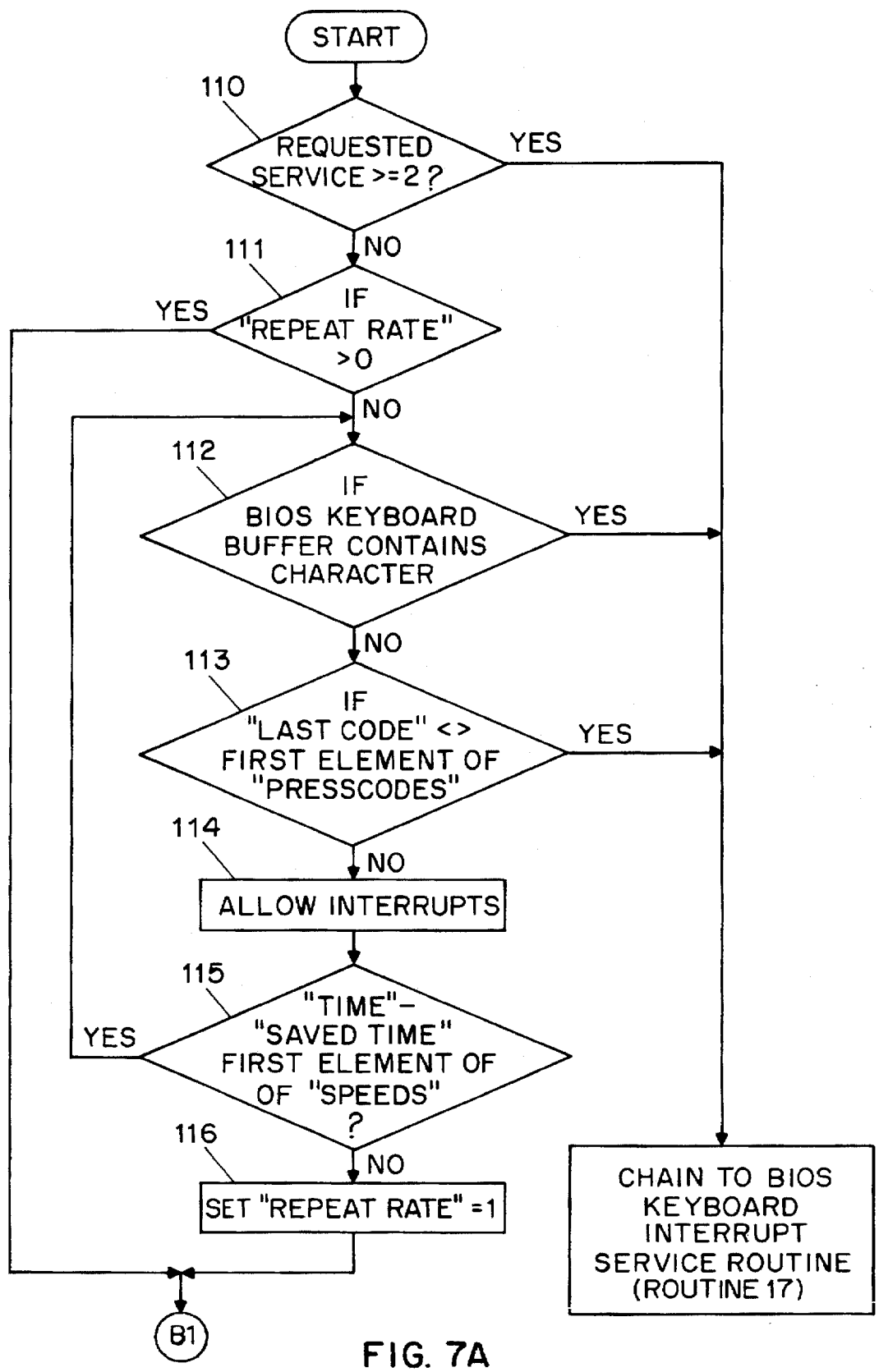
FIGS. 7A and 7B are different portions of a flowchart of the program segment related to an application program request for a key value in accordance with a TSR embodiment of the invention.
Figure 7B:
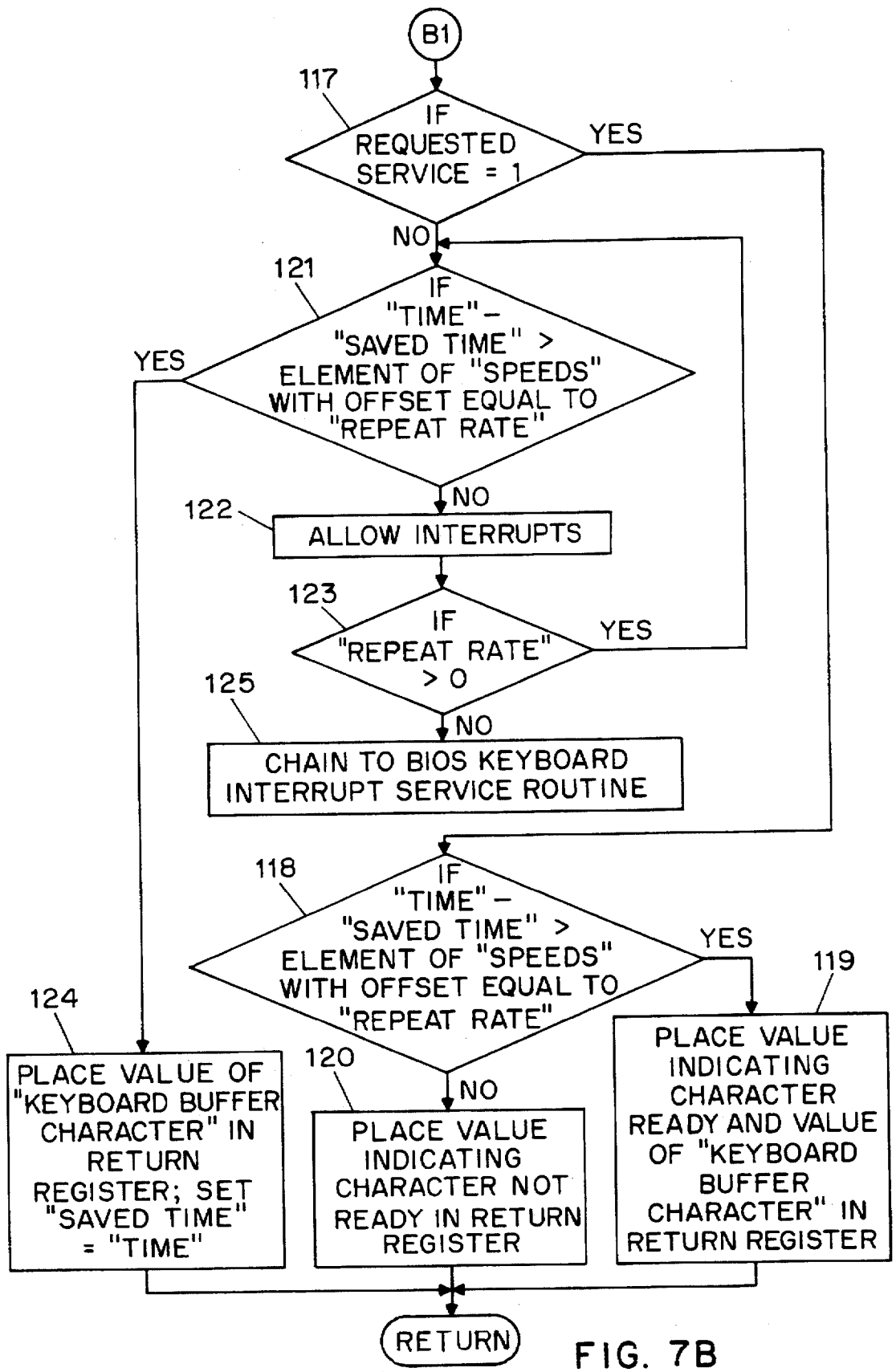

The Routine of FIGS. 7A and 7B

The routine of FIGS. 7A and 7B is used by the TSR in place of the BIOS routine 17 that would otherwise service the application program or DOS by providing key values from the keyboard when requested. Thus, the routine of FIGS. 7A and 7B (41 in FIG. 3) must emulate BIOS routine 17 in all respects. In the absence of the TSR program an application program or DOS receives key values by calling interrupt 16H. If the application program or DOS puts the number 0 in the AH register of the CPU 30 prior to calling INT 16H, then BIOS will return a key value from the keyboard 11. If a key giving rise to a key value has been pressed prior to calling INT 16H, that key value is returned to the program and the program continues. In the event that no key had been pressed at the time that INT 16H is called, BIOS will enter into a loop waiting for a key to be pressed. In the meantime program execution is suspended.

If the program puts the number 1 in the AH register of the CPU 30 prior to calling INT 16H, BIOS will return information concerning whether a key has already been pressed (e.g., there is already a key value in the keyboard buffer 15). Suspension of program execution while the program is awaiting keyboard input may be avoided by setting the AH register to 1 prior to calling INT 16H and setting the AH register to 0 only if INT 16H reports that there is a key value waiting in the keyboard buffer. It is noted that INT 16H provides other services to the application program or DOS in the event the AH register contains a value greater than 1. All these capabilities of INT 16H must be emulated if the TSR is to be used with unmodified application software or unmodified DOS.

Referring to FIG. 7A, the entry point for the routine depicted is a call to INT 16H by the application program or DOS. In block 110, the value in the AH register (the service number) is tested. If the service number is greater than 1, control is passed to the BIOS INT 16H routine. As shown in FIG. 2B, INT 16H refers to a value in the interrupt vector area 20. Thereafter, execution proceeds to the TSR area 23 and, if the value in AH is greater than 1 (shown by a dotted line), control passes to the 16H routine in the BIOS ROM 21.

If the service number is 0 or 1, block 111 is reached. In the case where repeating is in progress, control branches to B1 discussed below. If no repeating is in progress, keyboard buffer 15 is tested to determine whether it contains a key value (block 112). In the event that the keyboard buffer 15 contains a key value, control is passed to the BIOS routine 17, which provides that key value to the application program or DOS, and clears that key value from the keyboard buffer 15. No repetition is performed by the TSR until all key values in the keyboard buffer have been provided to the application program or DOS, since any key values in the buffer, which are the result of operator keystrokes, are provided to the application program or DOS before any key values repetitively generated by the TSR program.

In block 113, the variable LAST CODE corresponding to the most recent scan code handled by the routine of FIGS. 6A, 6B, 6C, and 6D, is compared with the first element of the PRESSCODES array. If LAST CODE does not match the first element of PRESSCODES, indicating that the most recent scan code was not generated by the repeat circuitry of the keyboard 11, control is passed to BIOS routine 17.

If the LAST CODE matches the first element of the PRESSCODES array, repetition is in order and block 114 is reached. In block 114 interrupts are enabled, since the loop of blocks 115, 112 and 113 might block other interrupt-driven processes. It is noted that invoking interrupts may change the results of the tests made in blocks 112 and 113.

As noted above, the REPEAT RATE variable is equal to zero if no repeating is taking place, and is equal to one if repeating is in progress as a result of a key being held down for a sufficiently long interval to initiate repeating. The REPEAT RATE variable is equal to two if a second key is pressed while repetition is taking place for a first key depression. It is noted that the REPEAT RATE variable may have a value greater than two if additional keys are pressed while repetition is taking place for the first key depression.

The REPEAT RATE variable is used as a pointer to a SPEEDS array, also located in the TSR variable area of RAM. The first element in the SPEEDS array is the length of time a key must be held down to initiate repeating. The second element in the SPEEDS array is the amount of time that is allowed to elapse between the provision of successive key values to the program if REPEAT RATE is one. The third element in the SPEEDS array is the amount of time that is allowed to elapse between the provision of successive key values to the program if REPEAT RATE is two. Fourth, fifth, and higher elements in the SPEEDS array are defined like the third element.

As described above, TIME is a value that increments at intervals of about 1/144th of a second. Each change of the value TIME is referred to a "tick". Each element in the SPEEDS array is expressed as a number of ticks. Thus, if the interval of time a key must be held down for repetition to begin is to be half a second, the first element in the SPEEDS array is set equal to 72 (ticks). If the repetition rate is to be 6 times per second, the second element in the SPEEDS array is set equal to 144/6, or 24 (ticks), and so on.

In block 115 the difference between the variable TIME and the variable SAVED TIME is compared against the first element of the SPEEDS array to determine whether a key has been held down long enough for repetition to begin. If the difference between TIME and SAVED TIME is less than the first element of the SPEEDS array, the routine loops back to blocks 112 and 113. If the difference between TIME and SAVED TIME is equal to or greater than the first element of the SPEEDS array, the routine passes to block 115, where the variable REPEAT RATE is set to 1 and the routine loops back to block 111.

The portion of the routine illustrated by FIG. 7A emulates the standard BIOS behavior by taking into consideration not only the possibility that the program may have asked for the next key value (AH=0) but also the possibility that the program may instead have asked whether the buffer contains any key values (AH=1). If the keyboard buffer contains at least one key value, and no repetition is taking place, control passes to BIOS routine 17 which informs the application program or DOS that the keyboard buffer contains key values. If the keyboard buffer is empty and the conditions for repetition are not fulfilled (i.e., the test of block 113 yields a yes) then again control passes to BIOS routine 17 and the BIOS routine 17 which informs the application program or DOS that no key values are present in the keyboard buffer.

FIG. 7B shows the flow diagram representing the portion of the routine that is invoked when repetition is in progress. In block 117 the service number is tested to determine whether the application program or DOS has asked whether the keyboard buffer contains any characters (AH=1). If the test yields a "yes", the routine passes to block 118. Since repetition is in progress, the test of block 118 is whether enough time has passed since the last time the key value being repeated was sent to the application program or DOS to require the same key value to be sent again. This test is expressed in terms of whether the difference between the variables TIME and SAVED TIME is greater than the element of the SPEEDS array pointed to by REPEAT RATE. If the test yields a "yes" answer, the routine passes to block 119, in which a value is placed in the return register indicating that a key value is ready, and indicating the next key value. If the test yields a "no" answer, the routine passes to block 120, in which a value is placed in the return register indicating that no key value is ready.

If the test in block 117 yields a "no" answer, which occurs if the value in the AH register is equal to 0, the routine passes to block 121. In block 121 a test is made to determine whether the difference between the variables TIME and SAVED TIME is greater than the element of the SPEEDS array pointed to by REPEAT RATE. If the test yields a "yes" answer, the routine passes to block 124, in which the key value being repetitively provided is placed in a return register, and SAVED TIME is set equal to TIME. If test of block 121 yields a "no" answer, the routine passes to block 122, where interrupts are enabled.

Interrupts are enabled not only to permit the execution of other interrupt-driven processes, but also to permit the periodic execution of the routine of FIG. 5, so that the variable TIME will be incremented. Allowing TIME to change permits eventual exit from the loop including blocks 121, 122, and 123. In addition, enabling interrupts permits the execution of the routine of FIGS. 6A, 6B, 6C and 6D, which may change the value of LAST CODE and the value of REPEAT RATE.

The routine of FIGS. 7A and 7B then passes from block 122 to 123 where a test is performed to determine whether the value of REPEAT RATE continues to be greater than 0. If this test yields a "yes" answer, the routine loops back to block 121. If the test yields a "no" answer, the routine passes to block 125, in which control is passed to the BIOS routine 17, which waits for the arrival of a key value is derived from a received scan code. It is noted that the loop which includes blocks 121, 122, and 123 signifies that not enough time has passed for another key value to provide the next repetitively generated key value, that the application program or DOS has suspended execution while awaiting the arrival of a requested key value, and that the value of REPEAT RATE has not been changed to be equal to zero.

Summary of Routine of FIGS. 7A and 7B

The routine of FIGS. 7A and 7B emulates the INT 16H routine which programs would otherwise depend on for receiving keyboard input. Under certain conditions, the routine of FIGS. 7A and 7B simply passes control to the BIOS INT 16H routine. Under other conditions, the routine of FIGS. 7A and 7B selectively modifies the contents of the keyboard buffer 15 and then passes control to the built-in BIOS INT 16H routine, to provide the features if the TSR embodiment of the invention. Finally, under remaining possible conditions, the routine of FIGS. 7A and 7B may itself provide the information to the application program or DOS. Exemplary source code, written partly in Microsoft C and partly in assembly language, for the TSR embodiment is provided below.

It will be noted that in the above-described embodiment, and indeed in each of the embodiments of the invention discussed herein, any key that is capable of repeating at all is capable of repeating at all available repeat rates. It will also be noted that the key to be employed at a given instant to change the repeat rate of some already-repeating key may be virtually any key on the keyboard; there is no need for the operator to select, at installation time, which key will be used to change repeat rates. This offers the advantage that even if no one key is optimal for such use in each of several application programs, the TSR will offer the enhanced repeat capability, as the operator may employ in each application program whichever key is optimal for the purpose of changing the repeat rate.

It will also be noted that in the above-described embodiment, and indeed in each of the embodiments of the invention discussed herein, the number of repeat rates available to the operator need not be limited to two. In the above-described embodiment, for example, the variable REPEAT RATE can take on values of 0, 1, 2, or more, and the arrays into which it points can be arrays with four or more entries. The structure in its disclosed form supports as many repeat rates as are permitted by the test at block 90.

Hardware Dependency

The inspection of scan codes represented by blocks 70 and 97 may be performed consecutively. At block 70 of FIG. 6A, the TSR program obtains scan code information from the keyboard interface 13. The logic of the TSR program requires that at block 97 of FIG. 6D, BIOS routine 14 be able to obtain the same scan code from the keyboard interface 13 after the TSR program has done so. Since the hardware structure of the keyboard interface 13 may vary from one personal computer to another, no one program routine will permit consecutive inspections of the same scan code by the TSR program and BIOS in all personal computers. Consequently, the TSR has to be tailored as necessary in the portions represented by blocks 70 and 97 to accommodate differences in hardware. The program steps described above are specific to the IBM PC AT. However, it would be known to one skilled in the art to adapt those program steps as necessary to other personal computers.

Incorporation in the BIOS

It will be apparent to those skilled in the art from the foregoing that the TSR routines described above may be incorporated in the BIOS routines to provide control of the repetition rate according to the invention without the necessity of a separate RAM-resident TSR program. The addition of the TSR routines would not alter the compatibility of the BIOS with respect to third-party software.

Incorporation in DOS

It will also be apparent to those skilled in the art from the foregoing that the TSR routines described above may be incorporated in DOS, so that when DOS is booted, the equivalent of the TSR routines is automatically loaded into the DOS area of RAM to provide control of the repetition rate according to the invention without the necessity of a separate RAM-resident TSR program. The addition of the TSR routines would not alter the compatibility of the DOS with respect to third-party software.

Incorporation in Application Programs

One skilled in the art would also find it apparent from the foregoing that the above-described TSR routines may be included in an application program to provide control of the repetition rate according to the invention without the necessity of a separate RAM-resident TSR program.

Incorporation in Keyboard Hardware

Further, one of ordinary skill in the art will also find it apparent to implement the functions of the above-described TSR routines in hardware in the keyboard and/or keyboard interface, to provide control of the repetition rate according to the invention without the necessity of any change in conventional software or the addition of a separate RAM-resident TSR program.

If implemented entirely in the hardware of an IBM PC AT-compatible keyboard, the keyboard could be used with any personal computer having the standardized keyboard interface 13, thus maintaining full compatibility with third-party software as well. Such an embodiment is described below.

The foregoing discussion would apply with input devices other than or in combination with keyboards. Any input device with discrete inputs (e.g. a touch screen or mouse or other pointing device). For example, the second or third input giving rise to repetition at a second or third rate need not be a key per se but could be any discrete input. This is also the case with an embodiment in which the invention is provided by way of an applications program, which will now be discussed.

Key Sequences

Where the control of the repetition rate according to the invention is to be accomplished by incorporating appropriate software routines within an application program, further benefits may be derived, as described in the further embodiment of the invention described below.

Figure 8:
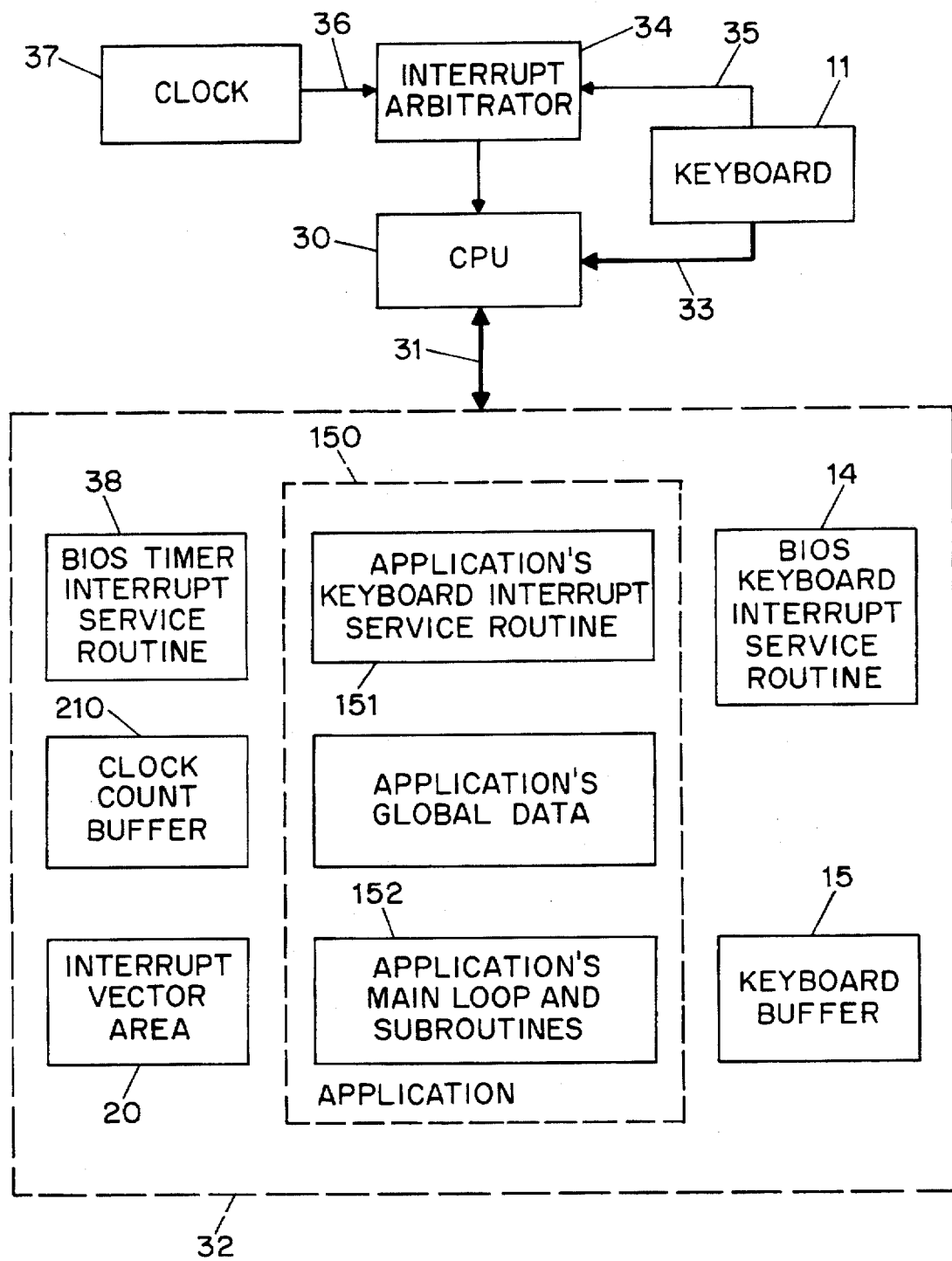
FIG. 8 shows a functional block diagram of a personal computer in accordance with an application program embodiment of the invention installed.

FIG. 8 is a block diagram showing the architecture in this further embodiment, and is identical to the block diagram of FIG. 3 except for the contents of the memory 32. The application program 150 providing the control of the repetition rate according to the invention includes its own keyboard routine 151 which bypasses the ordinarily used BIOS INT 16H routine whenever it is advantageous to do so, as described in further detail below.

Figure 9A:
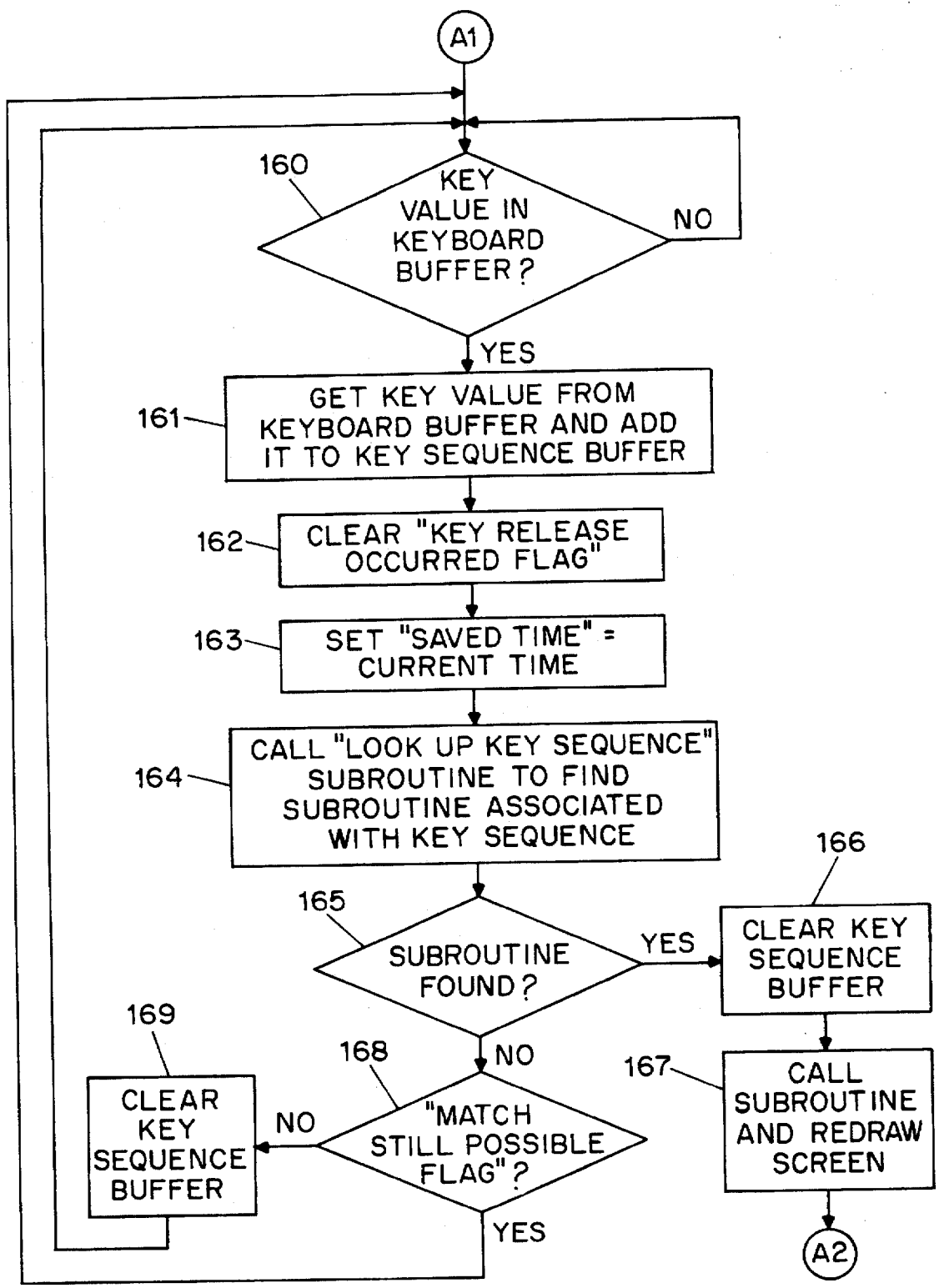
FIGS. 9A, 9B, and 9C are different segments of a flowchart of the main loop of an applications program in accordance with an application program embodiment of the invention.
Figure 9B:
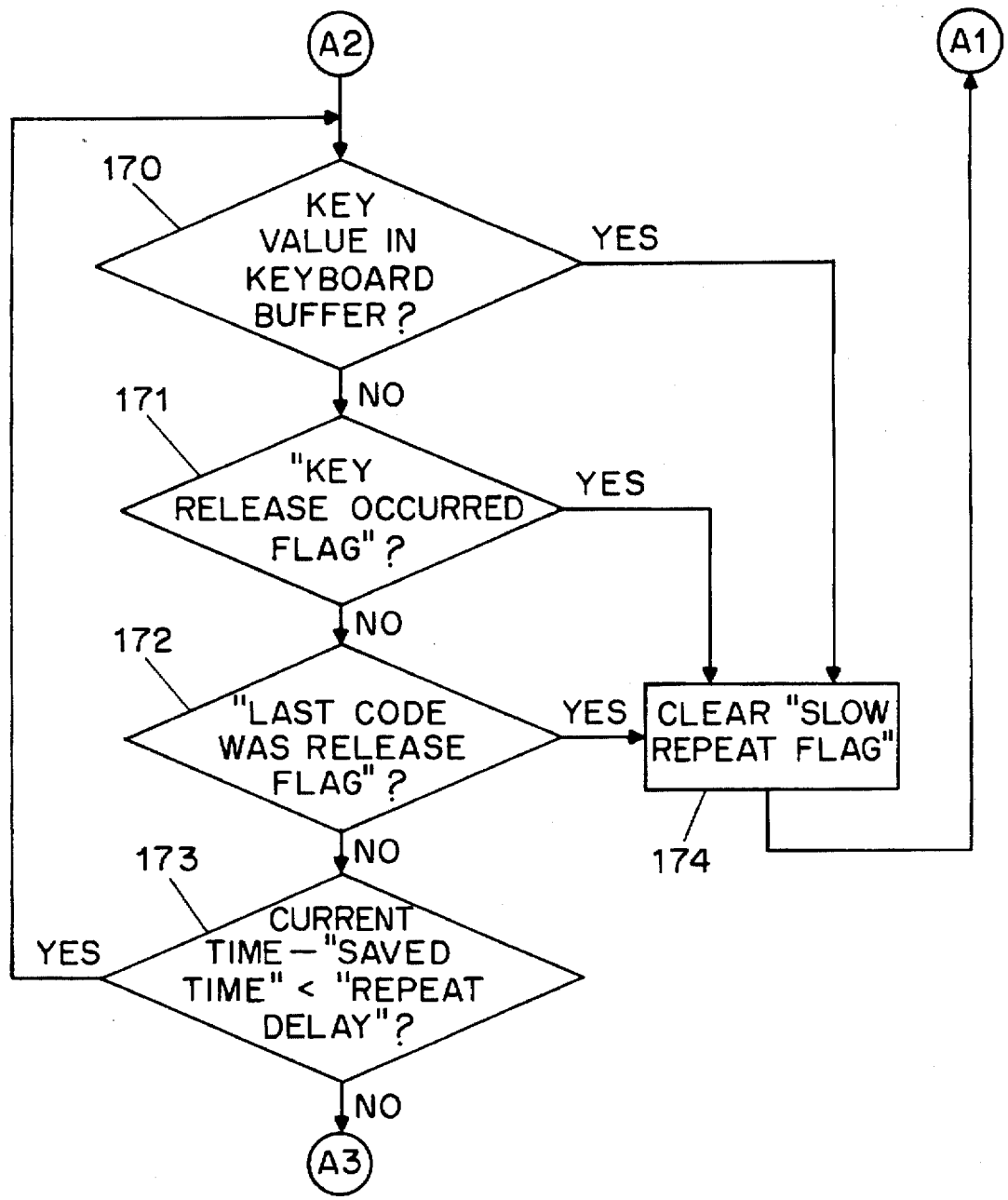
Figure 9C:
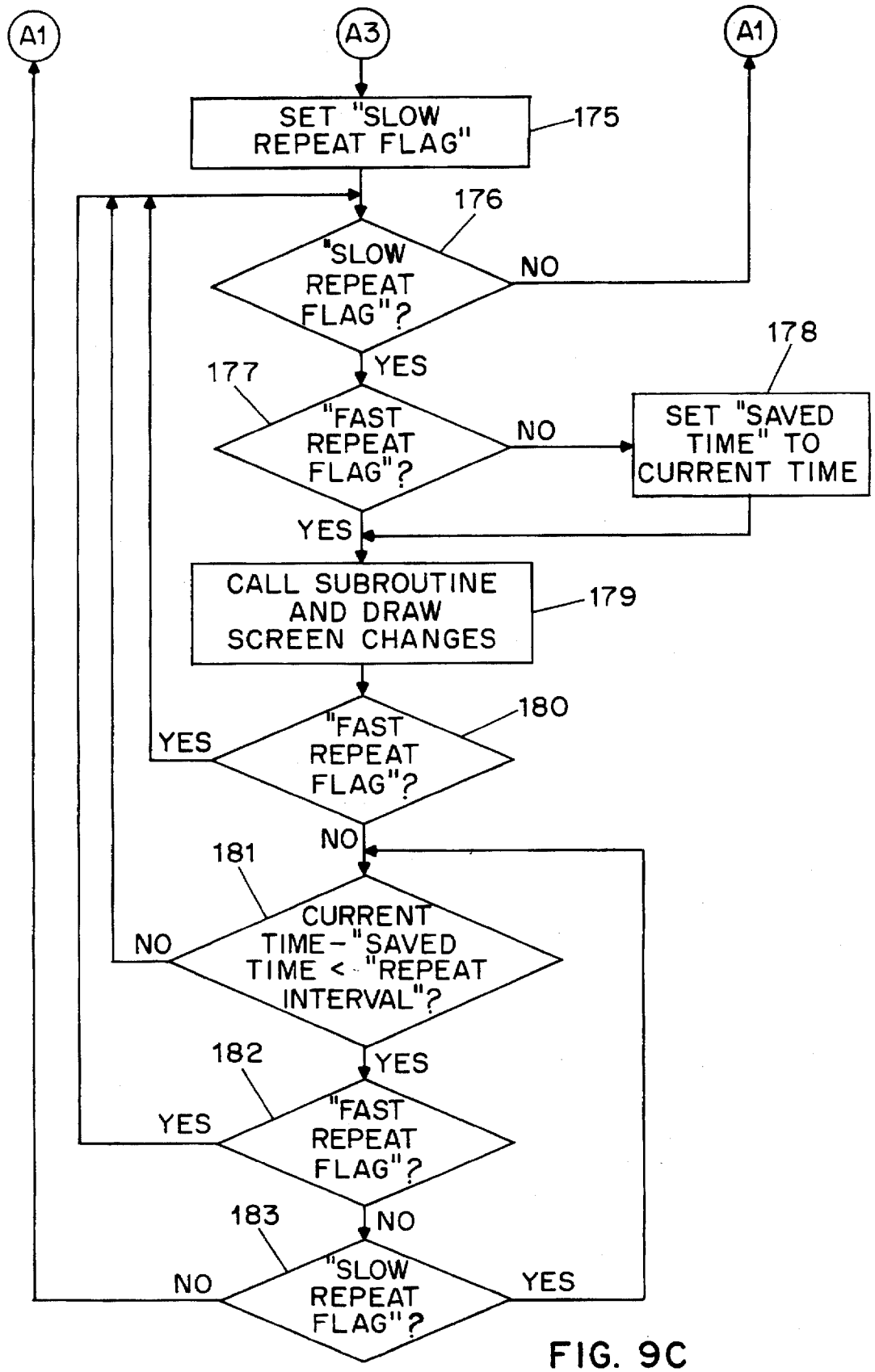

The Routine of FIGS. 9A, 9B, and 9C

FIGS. 9A, 9B, and 9C are a flow chart representative of a typical program 150 as modified to include control of the repetition rate in accordance with the invention. At the start of the application program A1 it is assumed that the program has been initialized and is now in its main loop. In its main loop, the program examines the values of pressed keys to identify from those values the actions that are desired by the operator, and performs those actions either once or repeatedly, depending on the states of certain flags, by calling certain subroutines. It remains in this main loop until such time as the operator enters appropriate key values to return to the DOS prompt. With some application programs, the design of the program is such that after receipt of each key value, the program determines what action, if any, to take. With other application programs, however, there will be at least some program actions that occur only after the entry of a corresponding sequence of key values, that is, while receipt of a particular key value may itself not give rise to a program action, that key value may, taken together with later key values, give rise to a program action. The present embodiment of the invention, with the invention incorporated into the application program, is capable of providing operator control of repetition rate in the latter case, that is, where the action that occurs repetitively can be the result of a sequence of key values.

At block 160, the program looks to see if there is a key value in the keyboard buffer 15. If there is none, the program enters a loop to wait for key value to be received in the keyboard buffer. The program exits from this loop when a key is pressed and an interrupt 35 is generated, causing the eventual loading of a key value into the keyboard buffer 15.

Once a key value is received by the program, it is placed in a KEY SEQUENCE BUFFER in block 161. The KEY SEQUENCE BUFFER is an area in the application program's global data area where consecutive series of key values are stored to hold key commands that consist of more than one keystroke. In block 162 a KEY RELEASE OCCURRED FLAG is cleared for later use. The KEY RELEASE OCCURRED FLAG is a location in the application program's global data area which is set when a key is released and which is cleared when a key is pressed. In block 163 the value CURRENT TIME contained in the clock count buffer 210 is stored to a variable SAVED TIME in the application program's global data area. This is analogous to the actions of block 74 in FIG. 6A.

In block 164 a subroutine is called which compares the contents of the KEY SEQUENCE BUFFER with a table of predefined sequences. While many of the table entries are likely to be one key value long, this embodiment is generalized to permit longer sequences. If there is a match with one of the table entries, then the address of the subroutine associated with that sequence (stored elsewhere in the table) is returned. This subroutine is called the "user-selected subroutine", and the key that produced the final key value that gave rise to the match is called a "selecting key".

Where a subroutine address was returned, indicating a match, the KEY SEQUENCE BUFFER is cleared (block 166). Thereafter, the subroutine whose address was returned is called (block 167), and typically the display screen of the computer (not shown in FIG. 8) is redrawn or updated.

Where no subroutine address was returned, the program proceeds to block 168, where a test is made to determine whether a MATCH STILL POSSIBLE FLAG is set. MATCH STILL POSSIBLE FLAG is a location in the application program's global data which is set when the LOOK UP SEQUENCE subroutine has failed to find a matching key sequence in its table, but has determined that a matching sequence could be found if certain additional keystrokes are entered. If the test yields a "no" answer, the program proceeds to block 169 where the KEY SEQUENCE BUFFER is cleared (block 169), and the program loops back to block 160. If the test of block 168 yields a "yes" answer, the program also loops back to block 160.

Turning to FIG. 9B, control passes to a loop consisting of blocks 170-173 to cause a delay before repetition, if any, begins. At the starting point A2 it is assumed that the operator is continuing to hold down the selecting key. In block 170, a test is made to determine whether there is a key value in the keyboard buffer. If the test produces a "yes" answer, the SLOW RESET FLAG is cleared in block 174 and control returns to the loop of block 160. The SLOW REPEAT FLAG is a location in the application program's global data area which is set while repetition at the slow rate is occurring and is otherwise cleared.

If the test of block 170 yields a "no" answer, the program proceeds to block 171 where a test is made to determine whether the KEY RELEASE OCCURRED FLAG is set. If the test produces a "yes" answer, the SLOW REPEAT FLAG is cleared and the program returns to the starting point A1 of FIG. 9A. If the test yields a "no" answer, the program proceeds to block 172 where a test is made to determine whether the LAST SCAN CODE WAS RELEASE FLAG is set. The LAST SCAN CODE WAS RELEASE FLAG is a location in the application program's data area which is set when a key is released and is cleared when a key is pressed. If the test yields a "yes" answer, the SLOW REPEAT FLAG is cleared and the program returns to the starting point A1 of FIG. 9A.

If the test of block 172 yields a "no" answer, the program proceeds to block 173 where a test is made to determine whether the difference between CURRENT TIME and SAVED TIME is less than REPEAT DELAY. The variable REPEAT DELAY is the length of the delay between the time a key is pressed and the time when the corresponding action is repeated for the first time, stored in the application program's global data. If the test yields a "yes" answer, the program loops back to block 170. If the test yields a "no" answer, then program proceeds to starting point A3 of FIG. 9C.

FIG. 9C shows the part of the program that calls the user-selected subroutine repeatedly at either a fast or slow rate depending on the status of various flags. First the SLOW REPEAT FLAG is set at block 175. Then the SLOW REPEAT FLAG is tested at block 176. If another scan code interrupt has been received and the scan code interrupt service routine has cleared the SLOW REPEAT FLAG, control returns to block 160 of FIG. 9A and no repeated calling of the user-selected subroutine occurs. Otherwise, the program proceeds to block 177.

In block 177 the FAST REPEAT FLAG is tested. The FAST REPEAT FLAG is a location in the application program's global data area which is set while repetition at the fast rate is occurring and is otherwise cleared. If FAST REPEAT FLAG is cleared only slow repeating will be performed, and the program proceeds to block 178 in which SAVED TIME is set to CURRENT TIME before further proceeding to block 179. If FAST REPEAT FLAG is set, repeating at the fast rate will be performed, and the program proceeds directly to block 179.

In block 179 the user-selected subroutine is called, and the display screen of the computer is redrawn or updated if appropriate. In block 180, the FAST REPEAT FLAG is again tested. If the test finds the FAST REPEAT FLAG to be set, the program loops back to block 176. As a result the subroutine is called again quite promptly. If the test of block 180 finds the FAST REPEAT FLAG to be cleared, then the program proceeds to block 181 where a test is made to determine whether the time that has passed since the last call of the subroutine is less than the predefined REPEAT INTERVAL. If the test yields a "no" answer, the program loops back to block 176 and another subroutine call follows. If the test of block 181 yields a "yes" answer, the program proceeds to block 182 where the FAST REPEAT FLAG is again tested. If the test finds the FAST REPEAT FLAG to be set, the program loops back to block 176. Otherwise, the program proceeds to block 183 where the SLOW REPEAT FLAG is again tested. If the SLOW REPEAT FLAG is found to be set, the program loops back to block 181. Otherwise, the program returns to the starting point A1 of FIG. 9A.

The various loops described in FIGS. 9A, 9B, and 9C may be exited if some other routine, that is the scan code interrupt service routine (also called keyboard interrupt service routine 151 of FIG. 8), changes the value of the FAST REPEAT FLAG, the SLOW REPEAT FLAG, or other flags. Of necessity such other routine must be capable of interrupting the execution of the loops described in FIGS. 9A, 9B, and 9C.

Figure 10A:
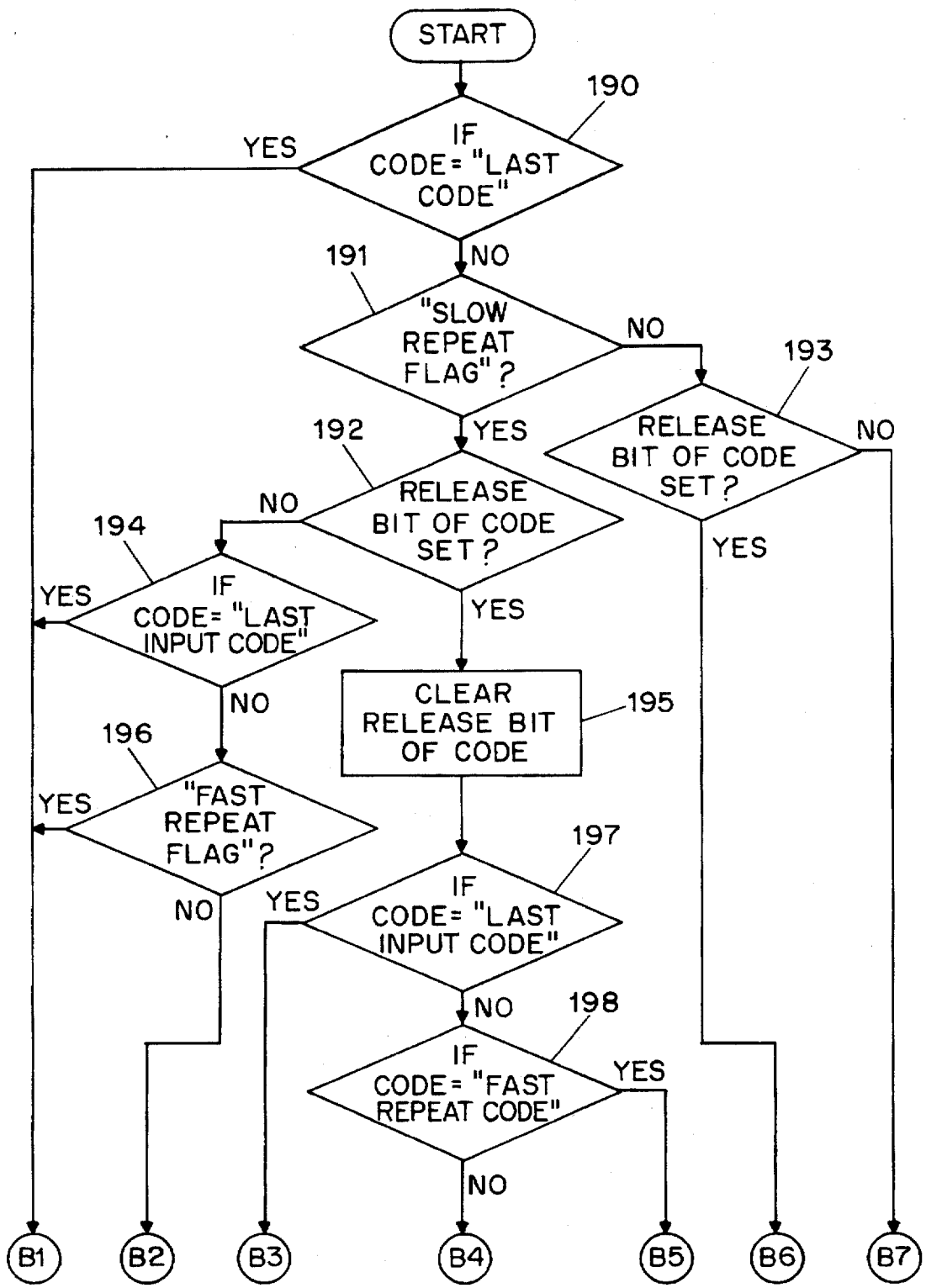
FIGS. 10A and 10B are different segments of a flowchart of the program segment related to the handling of scan code interrupts in accordance with an application program embodiment of the invention.
Figure 10B:
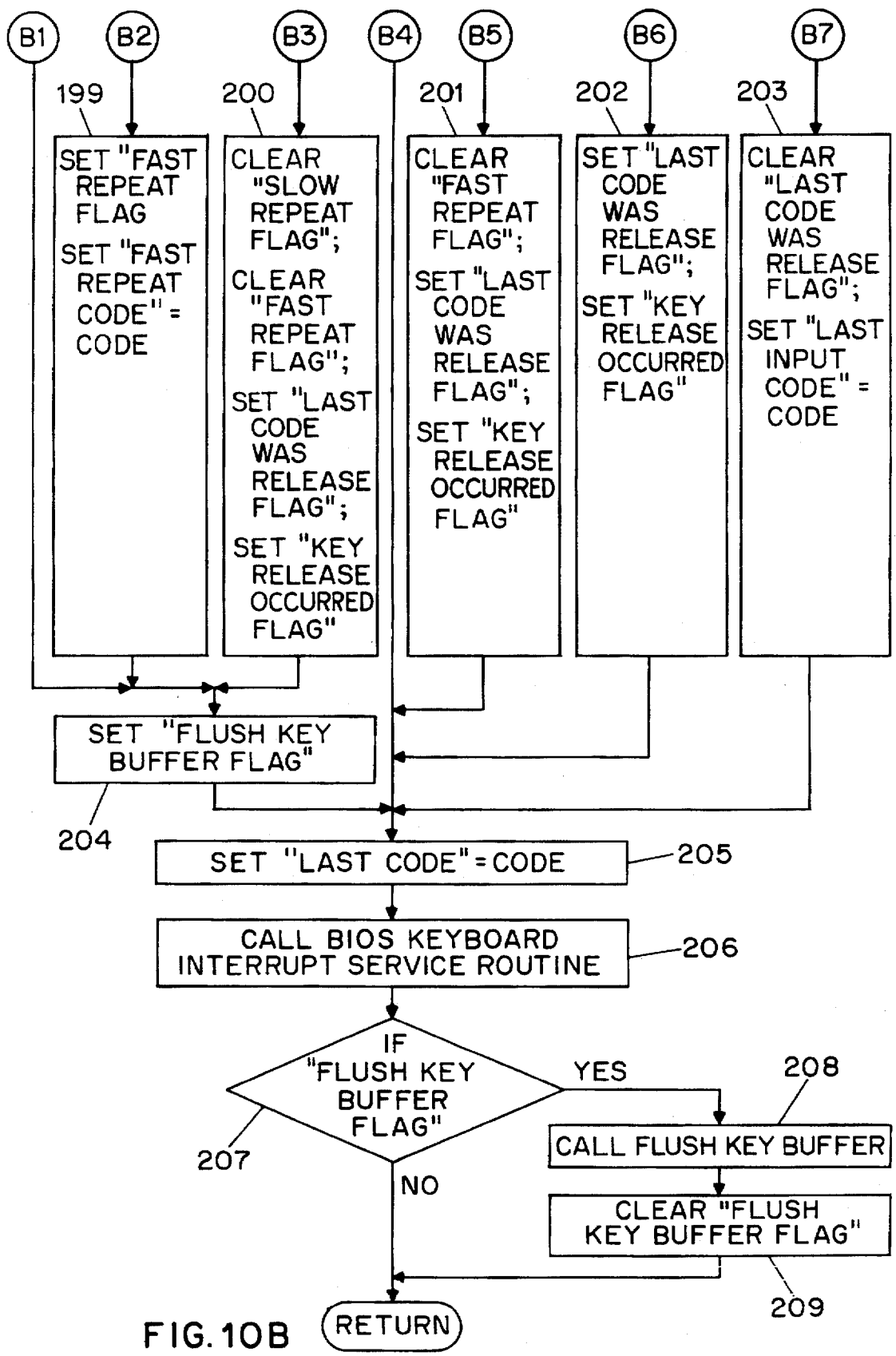

The keyboard interrupt service routine 151, which is shown in greater detail in FIGS. 10A and 10B, is used in place of BIOS routine 14. This is accomplished by modifying the interrupt vector area as described above in connection with the TSR embodiment.

The Routine of FIGS. 10A and 10B

The routine of FIGS. 10A and 10B is similar to routine of FIGS. 6A, 6B, 6C and 6D, in that each is initiated by the interrupt that is results from the arrival of a scan code from the keyboard 11. In addition, each sets or clears flags related to the repetition rate and modifies the keyboard buffer 15 as necessary to provide control of repetition rate according to the invention.

Referring now to FIG. 10A, execution starts and proceeds to block 190, where a test is made to determine whether the scan code just retrieved is identical to LAST CODE. LAST CODE is a variable in the application program's global data area, and contains the last scan code received. If the test yields a yes answer, control proceeds to B1, and block 204 which will set a flag resulting in a flushing of the key buffer.

Where the present scancode differs from the previous one, the program may follow one of several paths. If the present scan code was caused by another key depression, the program will shift to fast repeat by setting the FAST REPEAT FLAG. If the present scan code was caused by the release of a key, the program will either shift from fast repeat to slow repeat, or from slow repeat to no repeat. These paths each start from block 191. If the SLOW REPEAT FLAG has not been set, then the program proceeds to block 193 where a test is made to determine if the current scan code was the result of the releasing or the pressing of a key. If the former, the program next proceeds to block 202, where flags are set to indicate to the main loop on its next iteration that a previously performed user-selected subroutine is not to be repeated. If, however, the current scan code is the result of the pressing of a key, control passes to block 203, where a flag is cleared to enable the main loop to repeat a user-selected subroutine if one is invoked by the operator in the next iteration. Also in block 203 the current scan code is stored as LAST INPUT CODE, which identifies the most recently pressed key that has resulted in the creation of a key value. In the event that a user-selected subroutine is invoked in the next iteration of the main loop, the LAST INPUT CODE will identify that subroutine's selecting key.

Returning to block 191, if repetition is occurring at the slow rate (the SLOW RATE FLAG is set), a test is performed at block 192 to determine whether the current scan code resulted from the pressing or releasing of a key. If the former, a further test is performed at block 194 to determine whether the current scan code is identical to the previous scan code, indicating that it the current scan code is a repetition generated by the hardware of the keyboard. In the event of such a repetition, the scancode must be flushed and an appropriate flag is set, as shown in block 204.

If the current scan code is not identical to the previous scan code and the program is not already repeating at the fast rate (the FAST REPEAT FLAG is cleared), as tested at block 196, the FAST REPEAT FLAG is set at block 199, and the scan code that gave rise to repetition at the fast rate is stored. That scan code is likewise flushed, as result of the setting of a flag at block 204.

As exemplified by the test of the FAST REPEAT FLAG at block 196, the present embodiment provides two repetition rates. It will be apparent to those skilled in the art that additional repetition rates may be provided by obvious appropriate modifications to the program represented by the flow diagram of FIGS. 9A, 9B, 9C, 10A and 10B.

Returning to block 192, if the test of that block indicates that the current scan code is the result of a release of a key, the program proceeds to block 195. In block 195, the release bit of the scan code which resulted from the release of a key is cleared (i.e., 128 is subtracted from the value of the scan code) so that the current scan code may be compared with previously stored scan codes which resulted from the key depressions. As shown in block 197, if the current scan code, which resulted from the release of a key, matches the LAST INPUT CODE, then the key that started the repetition initially (i.e. the "selecting key") has been released, and both fast and slow repeating must be turned off, as shown in block 200.

Another path for the program is followed when current scan code, which resulted from the release of a key, matches the FAST REPEAT CODE, which means that the key that gave rise to repetition at the fast rate has been released. As shown in block 201, the FAST REPEAT flag is cleared so that the repetition occurs at the slow rate.

Each of the abovementioned paths leads to block 205, where the current scan code is saved for comparison with later received scan codes. At block 206, BIOS scan code routine 14 is called, in a manner similar to that at block 97 of FIG. 6D. If the scan code gives rise to a key value, the BIOS routine 14 places that key value in the keyboard buffer 15. Finally, if the FLUSH KEY BUFFER FLAG was previously set, as tested at block 207, then the keyboard buffer 15 is flushed and the FLUSH KEY BUFFER FLAG is cleared at block 209.

Embodiment in a Keyboard

Figure 11:
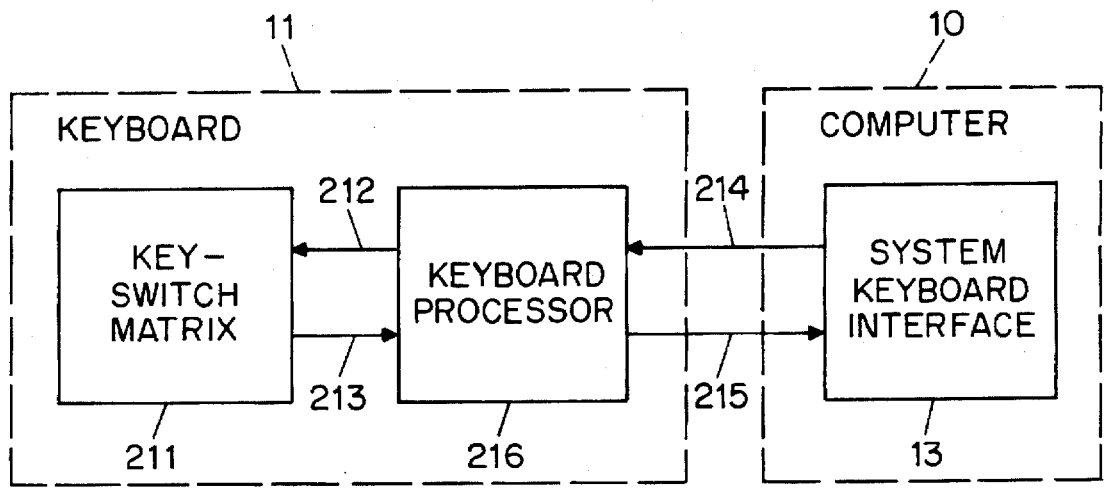
FIG. 11 shows a functional block diagram of a keyboard connected to a conventional personal computer.

FIG. 11 shows a functional block diagram of a known keyboard 11 and its connection to a computer 10. Inside the keyboard 11, a key-switch matrix 211 is connected to a keyboard processor 216 via input lines 212 and output lines 213. In turn, the keyboard processor 216 is connected by data lines 214 and control lines 215 to a keyboard interface 13 in the computer 10.

The keyboard processor 216 comprises a central processing unit, a read-only memory, a random-access memory, and ports (not shown in FIG. 11) that allow it to communicate with the key-switch matrix 211 and keyboard interface 13. The processor 216 applies scan signals via the input lines 212 to the key-switch matrix in a known manner, and with reference to the voltages present at the output lines 213 the processor 216 may determine which key switches, if any, have been depressed. The processor 216 derives a corresponding scan code, with the high-order bit indicating whether the scan code corresponds to the pressing or the releasing of a keyswitch, and conveys the scan code to the keyboard interface 13. The manner in which the scan code is processed in the computer 10 is as discussed above.

The components shown in FIG. 11 are commonly used in contemporary keyboards, and the diagram will be easily understood by persons with skill in the art of designing such hardware. The key-switch matrix 211 converts the mechanical actions of the operator's fingers on the keyboard into digital signals that are passed to the keyboard processor 216. The processor 216 uses logic to manipulate the signals according to programs stored in its memory, and then transmits the signals, in the form of scan codes, to the keyboard interface 13.

Figure 12:
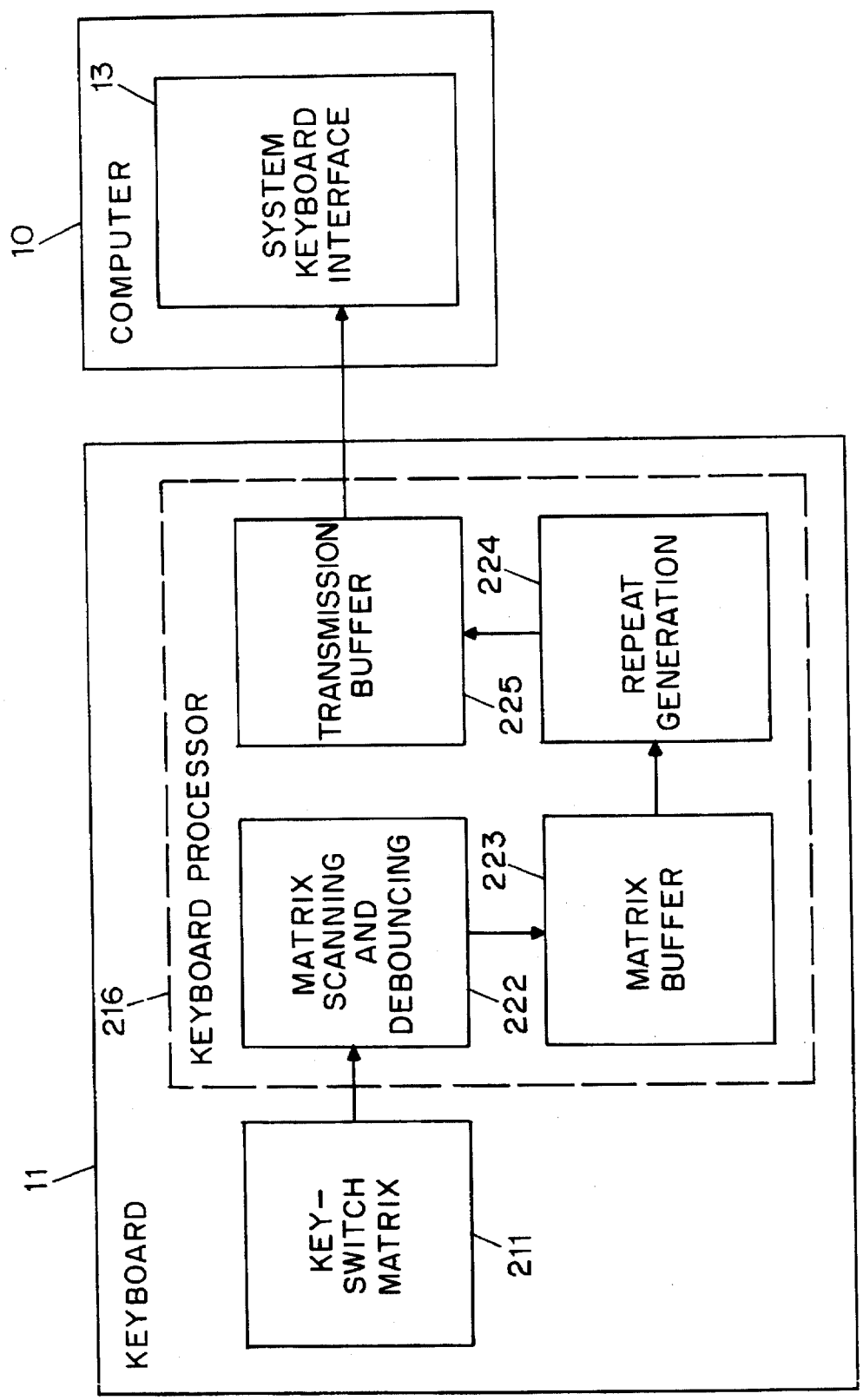
FIG. 12 shows the data flow within the keyboard in a conventional keyboard, including the repeat generation process.

Turning now to FIG. 12, there is shown in symbolic form the data flow within the apparatus of FIG. 11. Inside the keyboard 11, signals originate in the key-switch matrix 211 and pass to the processor 216, where they are subjected to a first stage of processing that consists of matrix scanning and debouncing symbolized by block 222. Key switches do not generally make an instantaneous transition from the nonconducting state to the conducting state. Instead, there is usually some jitter in the transition. For this reason, those skilled in the art of keyboard design provide for what is commonly referred to as "debouncing". Typically, a detected transition is ignored (i.e. does not give rise to a scan code) until the new state has remained unchanged at its new value for some small time interval. Each time a key is pressed or released, these processes produce as output a single scan code.

Scan codes are of two types: make codes, which correspond to key presses, and break codes, which correspond to releases. The most significant bit of a scan code is turned on to indicate that a key was pressed, and turned off to indicate that it was released. The other seven bits encode the key's distinctive identification number. Thus, a program can determine which key produced a code by stripping out the high bit, and it can determine whether the key was pressed or released by testing whether the code is greater than 127.

The debouncing process insures that only one code is produced each time a key is pressed or released, even though, as mentioned above, a key switch often makes and breaks contact numerous times on every keystroke due to microscopic vibrations and surface phenomena of the switch contacts.

After emerging from scanning and debouncing 222, the codes are held in a matrix buffer symbolized by block 223 before passing to the next stage of processing. The purpose of this first-in, first-out buffer of block 223 is to prevent the loss of data that would otherwise occur whenever a key was pressed or released before the keyboard interface 13 had finished processing the previous make or break code.

It should be recalled that scanning and debouncing processes symbolized by block 222 produce only a single code when a key is first depressed, and another code when it is released, but do not generate any codes during the interval between the two events, when a key is being continuously depressed. During this interval, the automatic production of repeated scan codes is accomplished by the third stage of processing, namely repeat generation symbolized by block 224.

On a typical commercially available keyboard 11, a repeat generation process 224 causes the keyboard 11 to emit repeated copies of the previously emitted scan code during a repeat interval whenever certain conditions are met. In keyboards 11 constructed according to the prior art, such repeated emissions occur at a single rate which cannot be changed without reprogramming the keyboard processor 216, but in the present invention, the repeat generation function symbolized by block 224 emits repeated codes at a variety of rates depending on how many other keys are concurrently depressed.

After the repeat generation of block 224, the scan codes enter a first-in, first-out transmission buffer 225, from which they pass to the keyboard interface 13 in the computer 10.

The above-described processes of blocks 222, 223, 224, and 225 are depicted in FIG. 12 by separate blocks, and could if desired be performed by a like number of pieces of dedicated hardware logic. It is noted, however, that in many keyboards 11 of the prior art these processes all occur within the same hardware, and are carried out by associated portions of the software in the program of the CPU of keyboard processor 216.

Figure 12A:
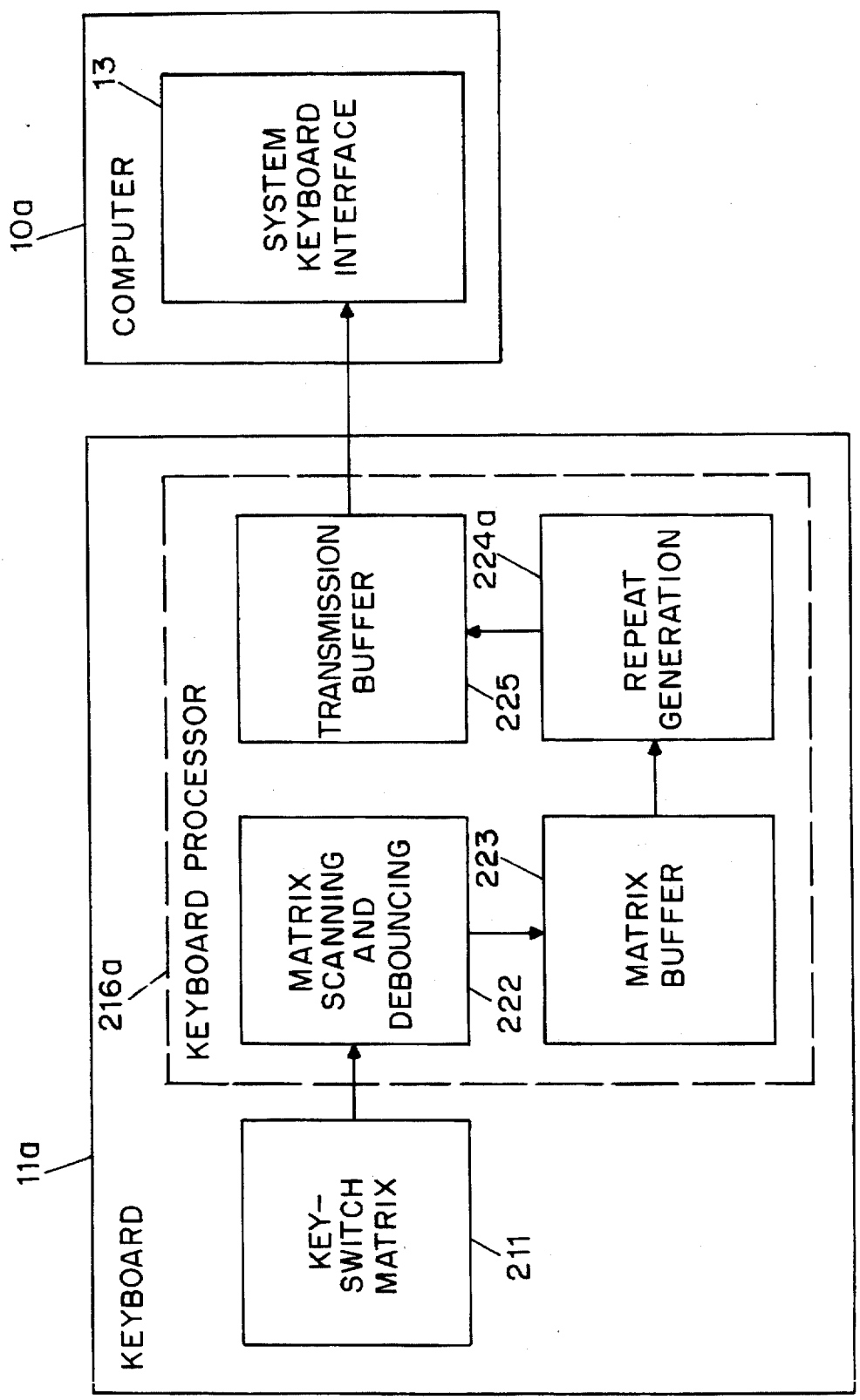
FIG. 12A shows the data flow within the keyboard in an improved keyboard embodiment of the invention, including an improved repeat generation process according to the invention.

In FIG. 12A there is shown a keyboard 11a embodying an additional embodiment of the invention. The keyboard 11a has a key switch matrix 211 as in known keyboards, and has a keyboard processor 216a. Keyboard processor 216a is much like the above discussed known keyboard processor 216 in that it has the matrix scanning and debouncing process 222, the matrix buffer process of block 223, and the transmission buffer of block 225. Keyboard processor 216a differs from that of known keyboards 11 in that the data flow includes an improved repeat generation process symbolized by block 224 and discussed in greater detail below.

State Diagram of the Repeat Generation Process

Figure 13:
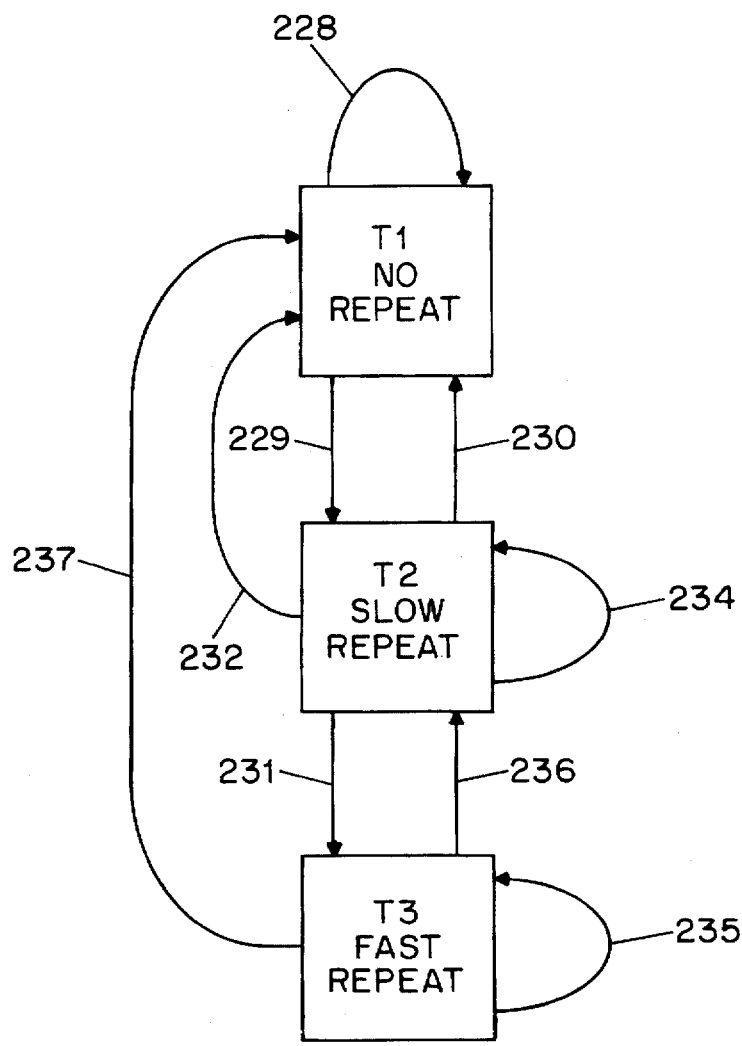
FIG. 13 is a state diagram showing the a transition of states in a keyboard embodiment of the invention.

Before examining the routine that is used to implement the repeat generation process of block 224a, it will be useful to examine a state diagram of that process, which is shown in FIG. 13. There are three states: no-repeat state T1, in which the processor 216a emits codes only when a key is moved; slow-repeat state T2, in which the processor 216a emits repeated copies of the most recently emitted make code at a slow rate; and fast-repeat state T3, which is similar to slow-repeat state T2, except that emission occurs at a fast rate.

Initially, the state is no-repeat state T1. If a key of key-switch matrix 211 is pressed, transition 228 is triggered, causing the processor 216a to emit the key's make code and to return to state T1. Following the press, the processor 216a remains in the no-repeat state T1 for a period of time equal to REPEAT DELAY, which is typically set at half a second. During this time, the processor 216a waits for another key press or release. If such an action occurs, transition 228 is triggered again, and the appropriate make or break code is emitted. Conversely, if no such action occurs as a result of the operator continuing to hold down the key for a period of time longer than REPEAT DELAY but taking no other action, the processor 216a follows transition line 229 and enters the slow-repeat state T2.

While in the slow-repeat state T2, the processor 216a repeatedly emits copies of the make code that was most recently derived from the output of matrix buffer 211 and remains in state T2. This transition is represented by transition line 234. The processor 216a remains in state T2 Until the operator releases the most recently pressed key, which causes a transition to return to the no-repeat state T1 via transition line 232.

In a keyboard according to the invention, the processor 216a also exits from the slow-repeat state T2 if the operator presses an additional key without releasing the first one. In such a case, the transition to be taken and state to be entered depend on whether the first depressed key is a character key or a shift key. A distinction must be made between the two cases because they signify different intentions on the operator's part.

In the first case, the operator has held down a character key long enough for repetition to begin, and has then pressed a second key, indicating that the operator wants the rate of repetition to increase. The processor 216a therefore enters the fast-repeat state T3 via transition path 231 and the processor 216a begins emitting copies of the first key's make code at an accelerated rate. Such repeated emissions are represented by line 235.

In cases where the first key is a shift key, however, the operator is not trying to make the computer generate a rapid succession of codes for that key. Rather, he or she wants the computer to generate a single shifted character that corresponds to the second key. The processor 216a therefore emits a single copy of the second key's make code and then returns to the no-repeat state T1 via transition line 230. The tasks of monitoring the shift state and translating the make code into the appropriate shifted character are performed in the computer 10 by other routines that form no part of this keyboard embodiment of the invention.

The fast-repeat state T3 is exited as a result of the operator releasing either of the two keys that caused state T3 to have been entered. The first of these keys, which triggered the transition of line 229, is the one that generated the make code which is being repeatedly emitted. If this key is released, the processor 216a returns to the no-repeat state T1 via transition line 237. The second pressed key is the one that triggered the transition of line 231, which caused the fast-repeat state T3 to be entered. If this key is released, the processor 216a returns to the slow-repeat state T2 via transition line 236. Exemplary source code representative of the transition lines 228–237 of the state diagram of FIG. 13 is provided below.

It will be appreciated that in known keyboards, a state diagram corresponding to that of FIG. 13 would have only two states, namely a non-repeating state and a repeating state.

Flow Chart of Repeat Generation Routine

Figure 14A:
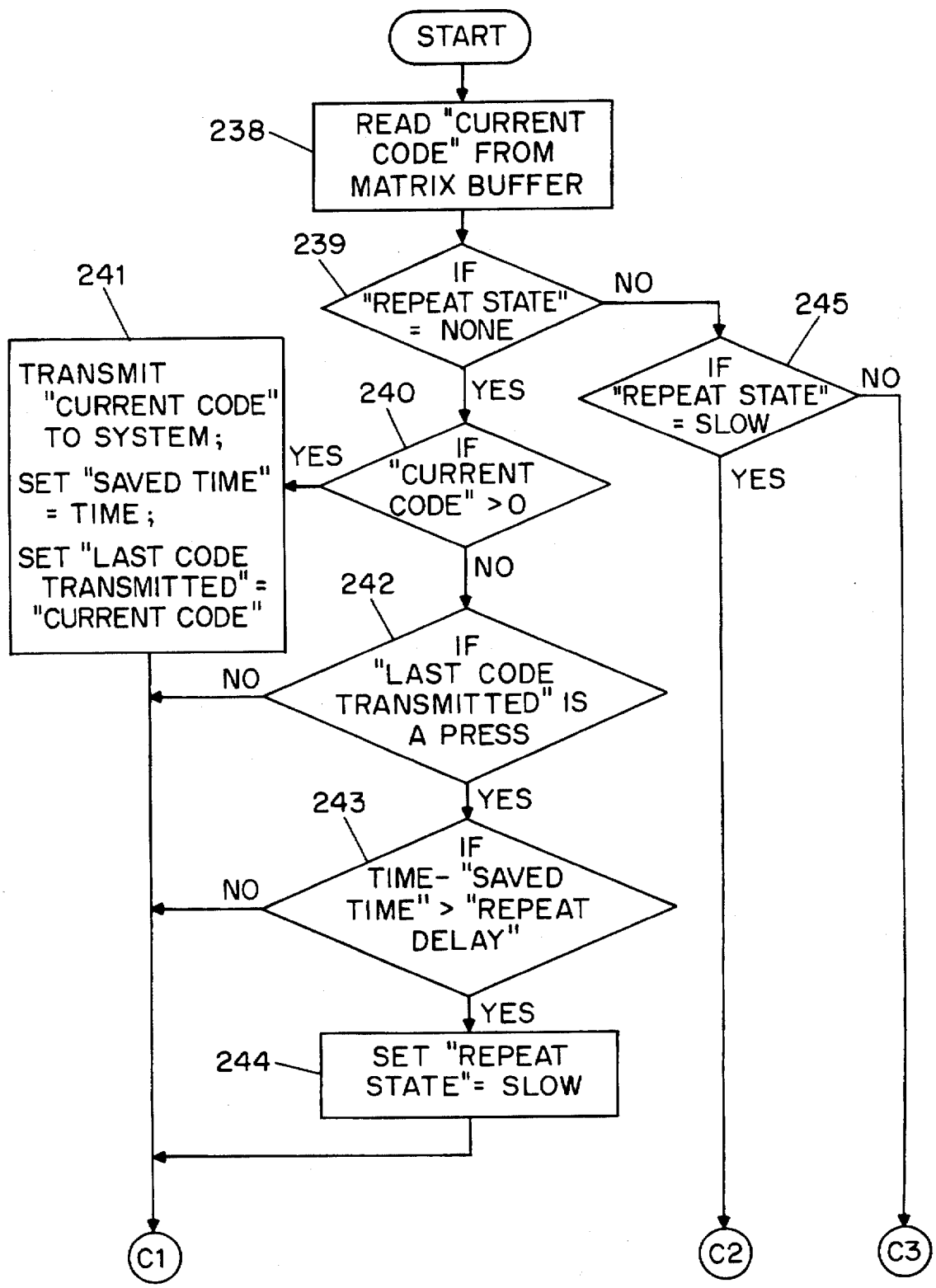
FIGS. 14A, 14B, 14C, and 14D are different portions of a flowchart of the improved repeat generation process of FIG. 12A according to the invention.
Figure 14B:
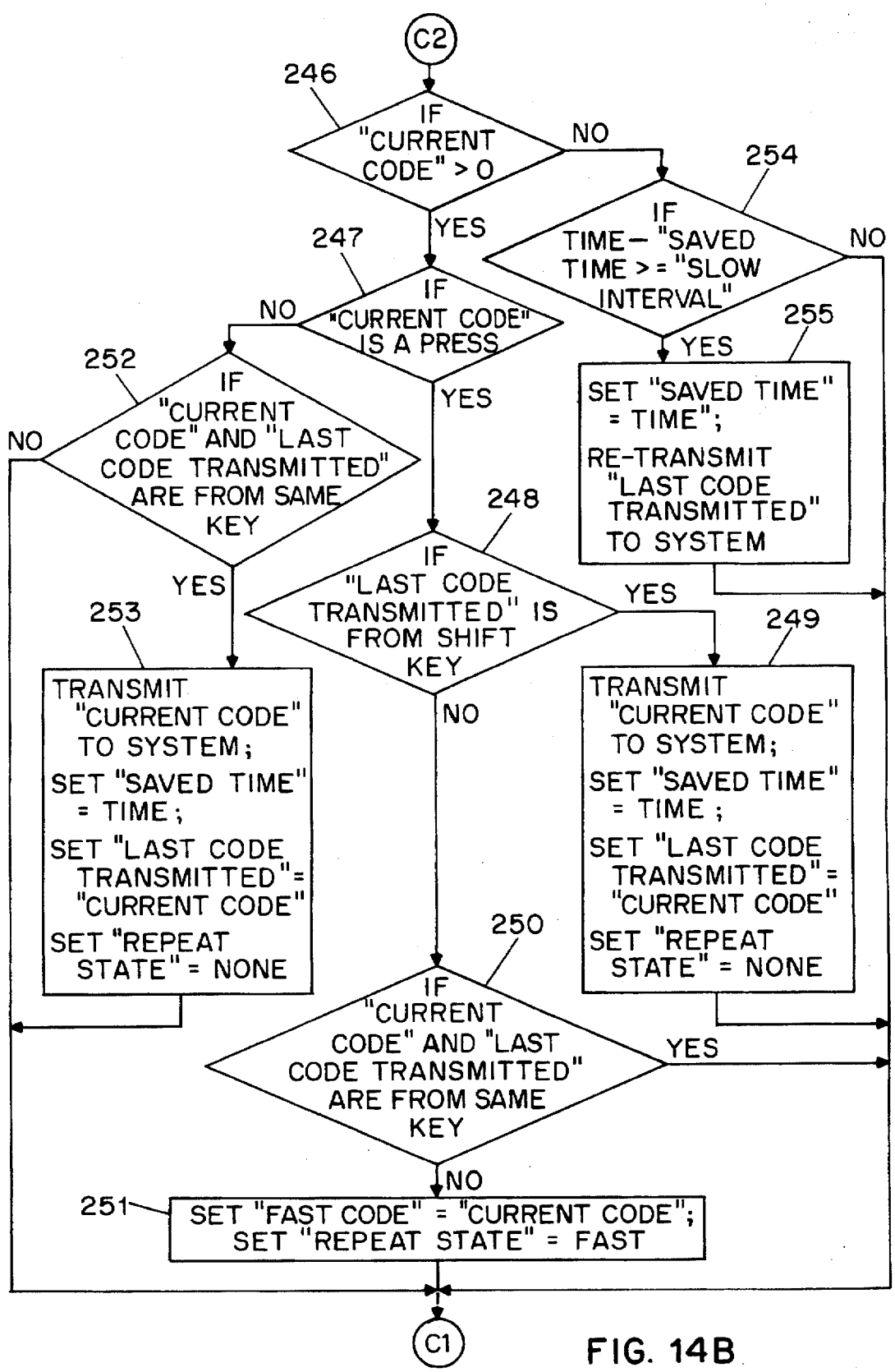
Figure 14C:
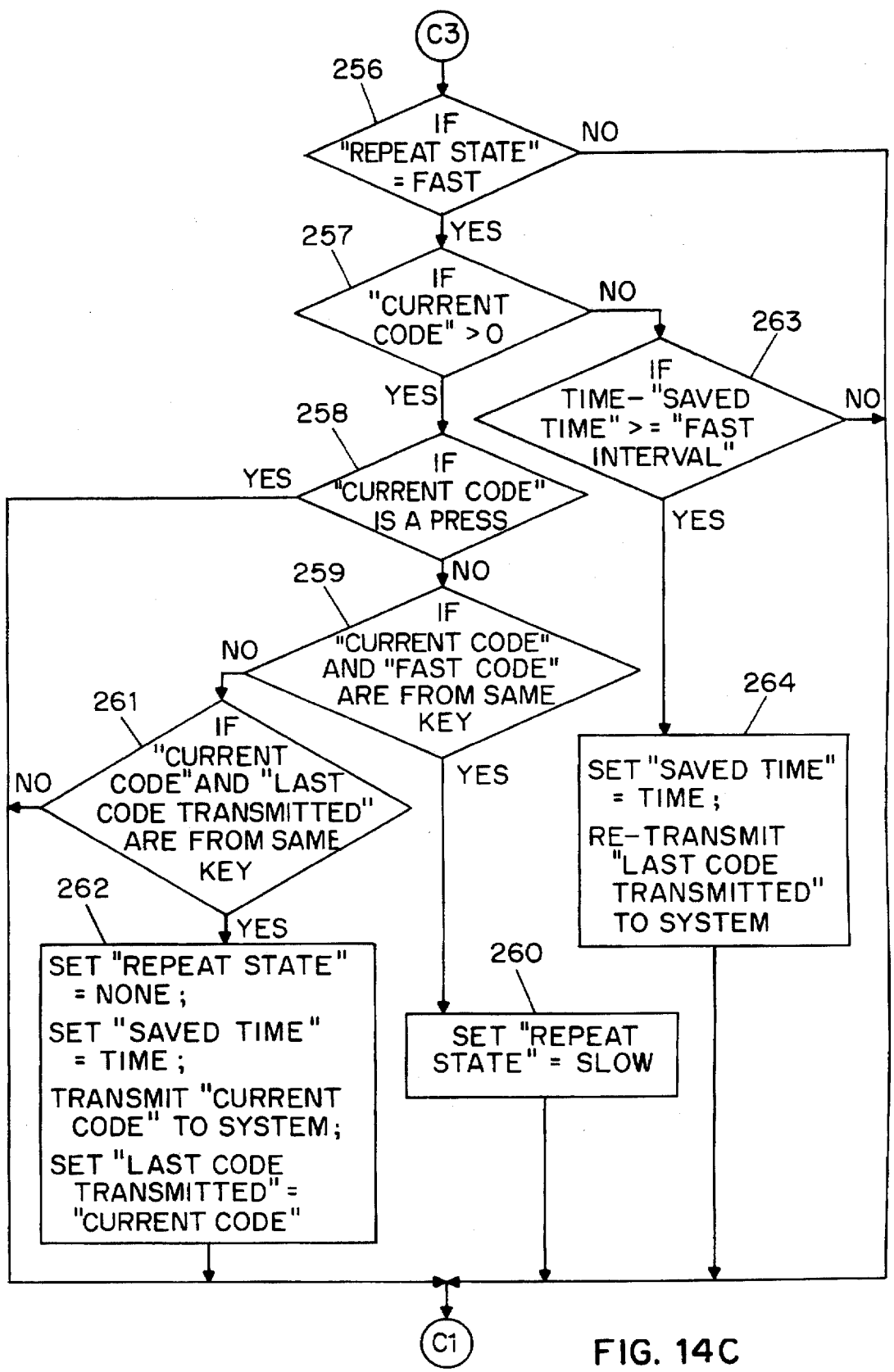

FIGS. 14A, 14B, and 14C show a flow chart of a routine that implements the repeat generation of block 224a according to the invention. Input for this routine consists of make and break codes that are taken on a first-in, first-out basis from the matrix buffer of block 223. If no code is stored in the buffer, the buffer releases a code with a value of zero. Output from the repeat generation process of block 224a consists of make and break codes which are emitted into the transmission buffer of block 225 according to the state diagram of FIG. 13.

Turning now to FIG. 14A, there is shown a portion of the routine implementing the repeat generation of block 224a according to the invention. In block 238, the routine starts by reading the next scan code from the matrix buffer 223 and storing it in a variable called CURRENT CODE. As noted above, if the buffer is empty, CURRENT CODE will be set to zero.

Blocks 239 and 245 test the state variable REPEAT STATE to determine which state the processor 216a is in. If the processor 216a is in the slow or fast repeat states (T2 or T3 of FIG. 13), control branches to C2 or C3 respectively. If the processor 216a is in the no-repeat state (T1 of FIG. 13), control passes to block 240.

A positive (i.e. non-zero) result at block 240 indicates that a value was stored in the matrix buffer 223, which means that a key was pressed or released. This triggers the actions shown in block 241, which correspond to transition line 228 of FIG. 13. The scan code is sent to the transmission buffer 225, where it will be sent to the keyboard interface 13, and two variables are set for use in other portions of this routine. One of these variables, LAST CODE TRANSMITTED, contains the make code that will be repeatedly transmitted if slow or fast repeat begins. The other variable, SAVED TIME, contains the present time, measured in clock ticks, and it will be used to measure the interval between transmissions of repeated codes so that repetition occurs at the proper rate.

A negative result at block 240 shows that the matrix buffer 223 was empty, meaning that no action has taken place at the key-switch matrix 211 since the previous iteration of the routine. In such a case, tests are carried out at blocks 242 and 243 to determine whether a key of key-switch matrix 211 has been held down long enough to enter the slow repeat state T2, which entry is represented in FIG. 13 by transition line 229. If the results of the two tests are positive, the state variable is changed to slow repeat T2 at block 244.

There are no other possible paths through the routine while in the no-repeat state T1. Regardless of which path is followed, control passes to C1, the bottom of the routine, where a test will be made that causes the routine to start again from the top unless the matrix buffer was empty on the previous iteration. The test is shown below in connection with FIG. 14D.

FIG. 14B shows the portion of the routine that determines the behavior of keyboard processor 216a when it is in the slow repeat state. At block 246, a test is made to determine whether a code was present in the matrix buffer 223. If not, nothing has changed at the key switch matrix 211, which means that the operator must still be holding down the key switch of matrix 211 that caused the slow repeat state T2 to have begun. A test is therefore made at block 254 to determine whether enough time has passed to emit a repeated copy of the previously transmitted make code. If so, at block 255 the code is transmitted and the new time is saved so that the test at block 254 may be performed again on a future iteration. Block 255 corresponds to transition line 234 of FIG. 13. Control then passes to C1, which is the bottom of the loop.

A negative result at block 246 indicates that the user has pressed or released a key switch of matrix 211 while in the slow repeat state T2. Referring to FIG. 13, it may be seen that there are three possible transitions to be taken in such a case. The first of the possible transition occurs when the operator has released the key that had generated the repeated scan code, which should make repetition stop. Blocks 247 and 252 test for the required conditions; if the first result is negative and the second one positive, control passes to block 253, where the CURRENT CODE, which is the break code associated with the key that supplied the previously transmitted make code, is transmitted so the computer 10 will know that the repeating key has been released. Three of the routine's variables are also updated for later use.

If the test at block 247 shows that a key switch of the matrix 211 has been pressed, the routine performs a further test at block 248 to distinguish the two cases previously described with reference to transition lines 230 and 231 of FIG. 13. The distinction depends on whether the first pressed key is a shift key, so the processor 216a compares the value of LAST CODE TRANSMITTED to a list of shift-key make codes that it keeps in memory. If LAST CODE TRANSMITTED matches one of the make codes on the list, indicating that it was generated by a shift key, control passes to block 249, which corresponds to transition line 230 of FIG. 13. Block 249, like block 253 which has been previously described, transmits the current code, changes the state to no-repeat state T1, and sets two additional variables for later use.

If the test at block 248 is negative, meaning that a character key and not a shift key had been held down when the current key was struck, an error-trapping test is made at 250 to make sure that the newly received scan code comes from a new key, not from the one which was already repeating. A positive result here indicates that the scanning and debouncing processes, which supply input to this routine, have produced two make codes in a row for the same key. This can only happen through an error, and in such a case the current scan code is ignored by allowing control to pass to the bottom of the loop at C1.

If the result of the error-trapping test at 250 is negative, as it always should be absent one of the above-described hardware or software exceptional events, actions are taken in Block 251 to enter the fast-repeat state T3. This block corresponds to transition line 231 of the state diagram of FIG. 13.

As can be seen from FIG. 14B, there are no other possible paths through the routine while the processor 216a is in the slow-repeat state T2. In every case, control passes to the bottom of the loop at C1.

FIG. 14C shows what happens when the processor 216a is in the fast-repeat state T3. The initial test at block 256 verifies that the state variable is set to FAST (i.e. state T3), which it must be by default. A negative result indicates that an error has occurred, and causes control to pass to the bottom of the loop at C1.

If the test at block 256 is positive, a further test at block 257 determines whether a key switch of matrix 211 has been pressed or released by comparing the value of CURRENT CODE to zero. If no key switch matrix action has occurred, the routine determines at 263 whether enough time has passed to retransmit the previous code at the fast rate. If so, the necessary actions are performed at block 264, which corresponds to transition line 235 of the state diagram of FIG. 13. Otherwise, control passes to the bottom of the loop at C1.

A positive result at block 257, indicating that an action has occurred at the key switch matrix 211, is of interest only if a key has been released, since pressing a key while in the fast-repeat state T3 has no effect. For this reason, a positive result at 258, showing that a key has been pressed, causes control to pass to the bottom of the loop at C1.

If the test at block 258 shows that a key has been released, a further test at 259 determines whether the "fast-repeat" key, i.e. the key that caused the processor 216a to enter the fast-repeat state T3, has been released. If so, appropriate action is taken in block 260, which corresponds to transition line 236 of the state diagram of FIG. 13, causing the processor 216a 216a to enter the slow-repeat state.

If the test at block 259 is negative, a further test is made at block 261 to determine whether the released key is the one that generated the repeating character. If so, appropriate actions are taken in block 262, which corresponds to transition line 237 of the state diagram of FIG. 13, to return to the no-repeat state T1.

If any other key has been released, the code may be safely ignored, and control passes directly from block 261 to the bottom of the loop at C1.

Figure 14D:
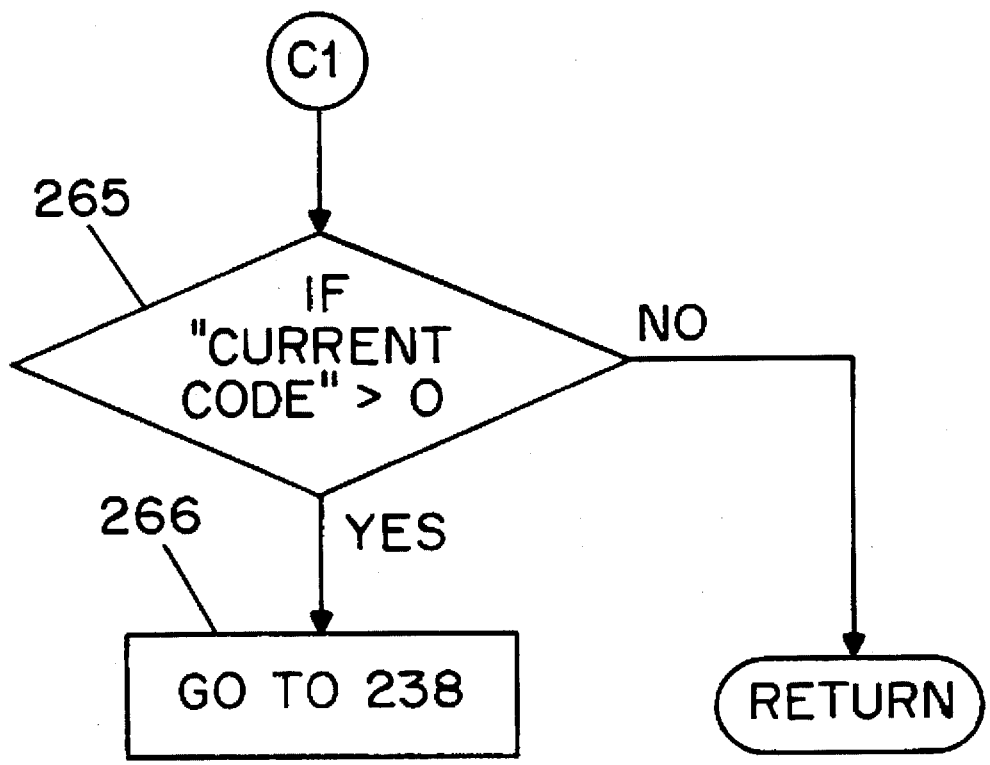

FIG. 14D shows a flow chart of the remainder of the routine of block 224a, where all possible paths converge.

These instructions cause the routine to repeat from the top until all scan codes have been read from the matrix buffer 223, and then to repeat from the top one more time with CURRENT CODE set to zero, which allows control to pass to blocks 244, 255, and 264. It should be noted that the routine will work if it returns directly from C1, without the subroutine of FIG. 14D, so long as it is called frequently enough. However, in some circumstances, the subroutine may slightly improve the routine's performance. Exemplary source code of the program segment for the above-described keyboard embodiment, together with the macro definitions and supporting routines to permit emulation on a model AT personal computer is provided below.

It will be noted that the keyboard 11a according to the invention offers advantages not found in keyboards of the prior art, and offers certain advantages not found in the previously described embodiments of the invention. Most important is complete hardware and software independence. Any computer 10 capable of accepting signals from conventional keyboards 11 can accept the scan code signals from the improved keyboard 11a. This is the case regardless of the operating system and application program in use in the computer 10. The improved repeat key function according to the invention is, by means of the improved keyboard 11a, available without the need of any modification of the computer 10, operating system, or application program.

As was discussed above in connection with the TSR embodiment of the invention, some application programs take their keyboard input by direct interrogation of the hardware interface 13, rather than by means of the standardized BIOS interrupt service routines. Such application programs do not permit provision of the improved repeat key function according to the TSR embodiment of the invention. Nonetheless, the keyboard embodiment of the invention may be employed even with such application programs.

As was discussed above in connection with the TSR embodiment of the invention, some computer interfaces 13 of some computers 10 differ on a hardware level, so that a TSR embodiment compatible with one particular model of computer 10 would not be compatible with such differing computer models. Such differing computer models do not permit provision of the improved repeat key function according to an otherwise usable TSR embodiment of the invention. Nonetheless, the keyboard embodiment of the invention may be employed with such differing computer models, so long as they accept known plug-in keyboards.

It will be appreciated that while the above description is of a keyboard with two repetition rates and three states T1, T2, and T3, the scope of the invention is not so limited and the keyboard capability could be expanded to provide more than two repetition rates. It will also be appreciated that while the above description is of a keyboard where the repetition rate of state T3 is higher than that of state T2, the scope of the invention is not so limited and the keyboard capability could provide, for example, that the repetition rate of state T3 is lower than that of state T2.

While the present invention has been described in terms of the foregoing specific embodiments, it will be apparent to those skilled in the art that various alterations and modifications may be made to the disclosed embodiments without departing from the spirit or scope of the present invention as defined by the appended claims. For example, appropriate hardware may be readily designed by those skilled in the art to provide the same logic as the programs described for the disclosed embodiments may be connected between the keyboard and the keyboard interface, to provide the controlled repetition rate in accordance with the invention.

I claim:

1. A computer comprising a processor, memory means for storing program and data for said processor, input means for entering a plurality of inputs, and input interface means for coupling said input means to said processor, said input interface means comprising:

first means responsive to a first input entered through said input means for communicating said first input to an interactive program being executed in said processor to cause said processor to respond to said first input by performing a first action, as determined by said interactive program;

second means responsive to said first input and a second input entered through said input means for causing said processor executing said interactive program to repetitively perform said first action at a predetermined first repetition rate for so long as said first and second inputs are being entered; and third means responsive to said first input and a third input entered through said input means for causing said processor executing said interactive program to repetitively perform said first action at a predetermined second repetition rate for so long as said first and third inputs are being entered, said third input having a position that is independent of and not relative to said first input or said second input and being an input which is not dedicated.

2. A computer according to claim 1 wherein said memory means includes a BIOS program executed by said processor and said first, second, and third means comprise one or more routines in said BIOS program.

3. A computer according to claim 1 wherein said memory means includes a terminate-and-stay-resident (TSR) program executed by said processor and said first, second, and third means comprise one or more routines in said TSR program.

4. A computer according to claim 1 wherein said memory means includes an application program executed by said processor and said first, second, and third means comprise one or more routines in said application program.

5. A computer according to claim 1 wherein said memory means includes an operating system program executed by said processor and said first, second, and third means comprise one or more routines in said operating system program.

6. A computer according to claim 1 wherein said memory means includes A BIOS program and an operating system program executed by said processor and said first, second, and third means comprise one or more routines in said BIOS program and said operating system program.

7. A computer according to claim 1 wherein said first, second, and third means comprise hard-wired circuitry of said computer.

8. A computer according to claim 1 wherein said input interface means comprises a second processor executing an input interface program and said first, second and third means comprise one or more routines in said input interface program.

9. A computer according to claim 1 wherein said input means comprises a keyboard with a plurality of keys, and said first input is a depression of one of said keys, said second input is the concurrent depression of a second one of said keys, and said third input is a depression of a third one of said keys.

10. A computer according to claim 1 and further comprising a display, wherein said input means comprises a keyboard having a plurality of keys, and wherein the keys include a cursor control key for moving a cursor on the display in a specified direction, the first means of said input interface means being responsive to a momentary depression of said cursor control key for causing the movement of said cursor on the display by one position in the specified direction, the second means of said input interface means being responsive to a depression of said cursor control key and to a depression of a second key for causing the cursor on the display to repetitively move the cursor in the specified direction at the first repetition rate for so long as said cursor control key and said second key remain depressed, and the third means of said input interface means being responsive to a depression of said cursor control key and to a depression of a third key for causing repetitive movement of said cursor on the display in the specified direction at a second repetition rate for so long as said cursor control key and said third key remain depressed.

11. A computer according to claim 1 and further comprising a display, wherein said input means comprises a keyboard having a plurality of keys, and wherein the keys include a scrolling control key for scrolling the display in a specified direction, the first means of said input interface means being responsive to a depression of said scrolling control key for causing scrolling of said display by one position in the specified direction, the second means of said input interface means being responsive to a depression of said scrolling control key and a depression of a second key for causing scrolling of said display repetitively in the specified direction at the first repetition rate for so long as said scrolling control key and said second key remain depressed, and the third means of said input interface means being responsive to a depression of said scrolling control key and a depression of a third key for causing repetitive scrolling of said display in the specified direction at a second repetition rate for so long as said scrolling control key and said third key remain depressed.

12. A computer comprising a processor, memory means for storing program and data for said processor, input means for entering a plurality of inputs, and input interface means for coupling said input means to said processor, said input interface means comprising:

first means responsive to a first input entered through said input means for communicating said first input to an interactive program being executed in said processor to cause said processor to respond to said first input by performing a first action, as determined by said interactive program;

second means responsive to said first input and a second input entered through said input means for causing said processor executing said interactive program to repetitively perform said first action at a predetermined first repetition rate for so long as said first and second inputs are being entered;

third means responsive to said first input and second input and a third input entered through said input means for causing said processor executing said interactive program to repetitively perform said first action at a predetermined second repetition rate for so long as said first, second and third inputs are being entered, said third input having a position that is independent of and not relative to said first input or said second input and being an input which is not dedicated; and fourth means responsive to said first input and second input and third input and a fourth input entered through said input means for causing said processor executing said interactive program to repetitively perform said first action at a predetermined third repetition rate for so long as said first, second, third and fourth inputs are being entered.

13. A computer according to claim 12 wherein said memory means includes a BIOS program executed by said processor and said first, second, third, and fourth means comprise one or more routines in said BIOS program.

14. A computer according to claim 12 wherein said memory means includes a terminate-and-stay-resident program executed by said processor and said first, second, third, and fourth means comprise one or more routines in said TSR program.

15. A computer according to claim 12 wherein said memory means includes an application program executed by said processor and said first, second, third, and fourth means comprise one or more routines in said application program.

16. A computer according to claim 12 wherein said memory means includes an operating system program executed by said processor and said first, second, third, and fourth means comprise one or more routines in said operating system program.

17. A computer according to claim 12 wherein said memory means includes a BIOS program and an operating system program executed by said processor and said first, second, third, and fourth means comprise one or more routines in said BIOS program and said operating system program.

18. A computer according to claim 12 wherein said first, second, third, and fourth means comprise hard-wired circuitry of said computer.

19. A computer according to claim 12 wherein said input interface means comprises a second processor executing an input interface program and said first, second, third, and fourth means comprise one or more routines in said input interface program.

20. A computer according to claim 12 wherein said input means comprises a keyboard with a plurality of keys, and said first input is a depression of one of said keys, said second input is a prolonged depression of said one of the keys, said third input is a subsequent concurrent prolonged depression of a first different one of the keys, and said fourth input is a subsequent concurrent prolonged depression of a second different one of the keys.

21. A computer according to claim 12 and further comprising a display, wherein said input means comprises a keyboard having a plurality of keys, and wherein the keys include a cursor control key for moving a cursor on the display in a specified direction, the first means of said input interface means being responsive to a momentary depression of said cursor control key for causing the movement of said cursor on the display by one position in the specified direction, the second means of said input interface means being responsive to a prolonged depression of said cursor control key for causing the cursor on the display to repetitively move the cursor in the specified direction at the first repetition rate for so long as said cursor control key remains depressed, the third means of said input interface means being responsive to a prolonged depression of said cursor control key and a concurrent prolonged depression of a first different one of said keys for causing repetitive movement of said cursor on the display in the specified direction at a second repetition rate for so long as said cursor control key and said first different one of said keys remain depressed, and the fourth means of said input interface means being responsive to a prolonged depression of said cursor control key and a concurrent prolonged depression of the said first different one of said keys, and a concurrent prolonged depression of a second different one of said keys, for causing repetitive movement of said cursor on the display in the specified direction at a third repetition rate for so long as said cursor control key and said first and second different ones of said keys remain depressed.

22. A computer according to claim 12 and further comprising a display, wherein said input means comprises a keyboard having a plurality of keys, and wherein the keys include a scrolling control key for scrolling the display in a specified direction, the first means of said input interface means being responsive to a momentary depression of said scrolling control key for causing the scrolling of said display by one position in the specified direction, the second means of said input interface means being responsive to a prolonged depression of said scrolling control key for causing scrolling of said display repetitively in the specified direction at the first repetition rate for so long as said scrolling control key remains depressed, the third means of said input interface means being responsive to a prolonged depression of said scrolling control key and the concurrent prolonged depression of a first different one of said keys for causing repetitive scrolling of said display in the specified direction at a second repetition rate for so long as said scrolling control key and said first different one of said keys remain depressed, and the fourth means of said input interface means being responsive to the prolonged depression of said scrolling control key and the concurrent prolonged depression of the said first different one of said keys, and the concurrent prolonged depression of a second different one of said keys, for causing repetitive movement of said scrolling of the display in the specified direction at a third repetition rate for so long as said scrolling control key and said first and second different ones of said keys remain depressed.

23. In an interactive computer system having an input means for entry of operator inputs and performing actions in response to said operator inputs, a method for repeating said actions at a variable rate comprising the steps of:

responding to a first operator input by performing a first action corresponding to said first operator input;

responding to a second operator input concurrent with said first operator input by performing said first action at a predetermined first repetition rate;

responding to a third operator input concurrent with said first and second operator inputs by performing said first action at a predetermined second repetition rate, said third operator input having a position that is independent of and not relative to said first operator input or said second operator input and being an input which is not dedicated; and responding to a fourth operator input concurrent with said first, second, and third operator inputs by performing said first action at a predetermined third repetition rate.

24. The method of claim 23 further comprising the step of setting a variable to indicate whether said second, third, and fourth inputs are being received.

25. The method of claim 24 wherein said variable is a pointer into an array containing values indicative of said first, second, and third repetition rates.

26. The method of claim 23 wherein said input means comprises a keyboard with a plurality of keys, and said first input is a depression of one of said keys, said second input is a prolonged depression of said one of the keys, said third input is a subsequent concurrent prolonged depression of a first different one of the keys, and said fourth input is a subsequent concurrent prolonged depression of a second different one of the keys.

27. The method of claim 23 wherein said input means comprises a keyboard with a plurality of keys, said first input is a depression of a first sequence of keys including a last key, said second input is a prolonging of the depression of said last key, said third input is a subsequent concurrent prolonged depression of a first key other than said last key, and said fourth input is a subsequent concurrent prolonged depression of a second key other than said last key and said first other key.

28. The method of claim 23 wherein said interactive computer system further comprises a display, said input means comprises a keyboard having a plurality of keys, and the keys include a cursor control key for moving a cursor on the display in a specified direction, the first recited responding step comprising being responsive to a momentary depression of said cursor control key for causing the movement of said cursor on the display by one position in the specified direction, the second recited responding step comprising responding to a prolonged depression of said cursor control key for causing the cursor on the display to repetitively move the cursor in the specified direction at the first repetition rate for so long as said cursor control key remains depressed, the third recited responding step comprising responding to a prolonged depression of said cursor control key and a concurrent prolonged depression of a first different one of the keys for causing repetitive movement of said cursor on the display in the specified direction at a second repetition rate for so long as said cursor control key and said first different one of said keys remain depressed, and the fourth recited responding step comprising responding to a prolonged depression of said cursor control key and the concurrent prolonged depression of the said first different one of said keys, and a concurrent prolonged depression of a second different one of said keys, for causing repetitive movement of said cursor on the display in the specified direction at a third repetition rate for so long as said cursor control key and said first and second different ones of said keys remain depressed.

29. The method of claim 23 wherein said interactive computer system further comprises a display, said input means comprises a keyboard having a plurality of keys, and the keys include a scrolling control key for scrolling the display in a specified direction, the first recited responding step comprising responding to a momentary depression of said scrolling control key for causing the scrolling of said display by one position in the specified direction, the second recited responding step comprising responding to a prolonged depression of said scrolling control key for causing scrolling of said display repetitively in the specified direction at the first repetition rate for so long as said scrolling control key remains depressed, the third recited responding step comprising responding to a prolonged depression of said scrolling control key and a concurrent prolonged depression of a first different one of the keys for causing repetitive scrolling of said display in the specified direction at a second repetition rate for so long as said scrolling control key and said first different one of said keys remain depressed, and the fourth recited responding step comprising responding to the prolonged depression of said scrolling control key and the concurrent prolonged depression of the said first different one of said keys, and a concurrent prolonged depression of a second different one of said keys, for causing repetitive movement of said scrolling of the display in the specified direction at a third repetition rate for so long as said scrolling control key and said first and second different ones of said keys remain depressed.

30. In an interactive computer system having an input device for entry of operator inputs and performing actions in response to said operator inputs, a method for repeating said actions at a variable rate comprising the steps of:

responding to a first operator input by performing a first action corresponding to said first operator input;

responding to a second operator input concurrent with said first operator input by performing said first action at a predetermined first repetition rate; and responding to a third operator input concurrent with said first operator input by performing said first action at a predetermined second repetition rate, said third operator input having a position that is independent of and not relative to said first operator input or said second operator input and being an input which is not dedicated.

31. The method of claim 30 further comprising the step of setting a variable to indicate whether said second and third inputs are being received.

32. The method of claim 31 wherein said variable is a pointer into an array containing values indicative of said first and second repetition rates.

33. The method of claim 30 wherein said input means comprises a keyboard with a plurality of keys, and said first input is a depression of one of said keys, said second input is a subsequent concurrent depression of a second one of the keys, and said third input is a subsequent concurrent depression of a third one of the keys.

34. The method of claim 30 wherein said input means comprises a keyboard with a plurality of keys, said first input is a depression of a first sequence of keys including a last key, said second input is a subsequent concurrent depression of a first key other than said last key, and said third input is a subsequent concurrent depression of a second key other than said last key.

35. The method of claim 30 wherein said interactive computer system further comprises a display, said input means comprises a keyboard having a plurality of keys, and the keys include a cursor control key for moving a cursor on the display in a specified direction, the first recited responding step comprising responding to a momentary depression of said cursor control key for causing the movement of said cursor on the display by one position in the specified direction, the second recited responding step comprising responding to a depression of said cursor control key and a depression of a second one of the keys for causing the cursor on the display to repetitively move the cursor in the specified direction at the first repetition rate for so long as said cursor control key and said second one of the keys remains depressed, and the third recited responding step comprising responding to a depression of said cursor control key and a concurrent depression of a third one of the keys for causing repetitive movement of said cursor on the display in the specified direction at a second repetition rate for so long as said cursor control key and said third one of said keys remain depressed.

36. The method of claim 30 wherein said interactive computer system further comprises a display, said input means comprises a keyboard having a plurality of keys, and the keys include a scrolling control key for scrolling the display in a specified direction, the first recited responding step comprising responding to a depression of said scrolling control key for causing the scrolling of said display by one position in the specified direction, the second recited responding step comprising responding to a depression of said scrolling control key and a depression of a second one of the keys for causing scrolling of said display repetitively in the specified direction at the first repetition rate for so long as said scrolling control key and said second one of the keys remains depressed, and the third recited responding step comprising responding to a depression of said scrolling control key and a depression of a third one of the keys for causing repetitive scrolling of said display in the specified direction at the second repetition rate for so long as said scrolling control key and said third one of said keys remain depressed.

37. A computer comprising a processor, memory means for storing program and data for said processor, input means separately housed from said processor and said memory means for entering a plurality of inputs, and input interface means separately housed from said processor and said memory means for coupling said input means to said processor, said input interface means comprising:

first means responsive to a first input entered through said input means for communicating said first input to an interactive program being executed in said processor to cause said processor to respond to said first input by performing a first action, as determined by said interactive program;

second means responsive to said first input and a second input entered through said input means for causing said processor executing said interactive program to repetitively perform said first action at a predetermined first repetition rate for so long as said first and second inputs are being entered; and third means responsive to said first input and a third input entered through said input means for causing said processor executing said interactive program to repetitively perform said first action at a predetermined second repetition rate for so long as said first and third inputs are being entered, said third input having a position that is independent of and not relative to said first input or said second input and being an input which is not dedicated.

38. A computer according to claim 37 wherein said input means comprises a processor executing a program and first, second, and third means comprise one or more routines in said program.

39. A computer according to claim 37 wherein said input interface means is separately housed from said input means and comprises a second processor executing an input interface program and said first, second and third means comprise one or more routines in said input interface program.

40. A computer according to claim 37 wherein said input means comprises a keyboard with a plurality of keys, and said first input is a depression of one of said keys, said second input is a concurrent depression of a second one of said keys, and said third input is a concurrent depression of a third one of said keys.

41. A computer according to claim 37 and further comprising a display, wherein said input means comprises a keyboard having a plurality of keys, and wherein the keys include a cursor control key for moving a cursor on the display in a specified direction, the first means of said input interface means being responsive to a momentary depression of said cursor control key for causing the movement of said cursor on the display by one position in the specified direction, the second means of said input interface means being responsive to a depression of said cursor control key and to a depression of a second key for causing the cursor on the display to repetitively move the cursor in the specified direction at the first repetition rate for so long as said cursor control key and said second key remain depressed, and the third means of said input interface means being responsive to a depression of said cursor control key and to a depression of a third key for causing repetitive movement of said cursor on the display in the specified direction at a second repetition rate for so long as said cursor control key and said third key remain depressed.

42. A computer according to claim 37 and further comprising a display, wherein said input means comprises a keyboard having a plurality of keys, and wherein the keys include a scrolling control key for scrolling the display in a specified direction, the first means of said input interface means being responsive to a depression of said scrolling control key for causing scrolling of said display by one position in the specified direction, the second means of said input interface means being responsive to a depression of said scrolling control key and a depression of a second key for causing scrolling of said display repetitively in the specified direction at the first repetition rate for so long as said scrolling control key and said second key remain depressed, and the third means of said input interface means being responsive to a depression of said scrolling control key and a depression of a third key for causing repetitive scrolling of said display in the specified direction at a second repetition rate for so long as said scrolling control key and said third key remain depressed.

43. A computer comprising a processor, memory means for storing program and data for said processor, input means separately housed from said processor and said memory means for entering a plurality of inputs, and input interface means separately housed from said processor and said memory means for coupling said input means to said processor, said input interface means comprising:

first means responsive to a first input entered through said input means for communicating said first input to an interactive program being executed in said processor to cause said processor to respond to said first input by performing a first action, as determined by said interactive program;

second means responsive to said first input and a second input entered through said input means for causing said processor executing said interactive program to repetitively perform said first action at a predetermined first repetition rate for so long as said first and second inputs are being entered; and third means responsive to said first input and second input and a third input entered through said input means for causing said processor executing said interactive program to repetitively perform said first action at a predetermined second repetition rate for so long as said first, second and third inputs are being entered, said third input having a position that is independent of and not relative to said first input or said second input and being an input which is not dedicated.

44. A computer according to claim 43 wherein said input means comprises a processor executing a program and first, second, and third means comprise one or more routines of said program.

45. A computer according to claim 43 wherein said input interface means is separately housed from said input means and comprises a second processor executing an input interface program and said first, second and third means comprise one or more routines in said input interface program.

46. A computer according to claim 43 wherein said input means comprises a keyboard with a plurality of keys, and said first input is a depression of one of said keys, said second input is the prolonging of the depression of said one of the keys, and said third input is a subsequent concurrent prolonged depression of a different one of the keys.

47. A computer according to claim 43 and further comprising a display, wherein said input means comprises a keyboard having a plurality of keys, and wherein the keys include a cursor control key for moving a cursor on the display in a specified direction, the first means of said input interface means being responsive to a momentary depression of said cursor control key for causing the movement of said cursor on the display by one position in the specified direction, the second means of said input interface means being responsive to a prolonged depression of said cursor control key for causing the cursor on the display to repetitively move the cursor in the specified direction at the first repetition rate for so long as said cursor control key remains depressed, and the third means of said input interface means being responsive to a prolonged depression of said cursor control key and a concurrent prolonged depression of a different one of said keys for causing repetitive movement of said cursor on the display in the specified direction at a second repetition rate for so long as said cursor control key and said different one of said keys remain depressed.

48. A computer according to claim 43 and further comprising a display, wherein said input means comprises a keyboard having a plurality of keys, and wherein the keys include a scrolling control key for scrolling the display in a specified direction, the first means of said input interface means being responsive to a momentary depression of said scrolling control key for causing the scrolling of said display by one position in the specified direction, the second means of said input interface means being responsive to a prolonged depression of said scrolling control key for causing scrolling of said display repetitively in the specified direction at the first repetition rate for so long as said scrolling control key remains depressed, and the third means of said input interface means being responsive to a prolonged depression of said scrolling control key and a concurrent prolonged depression of a different one of said keys for causing repetitive scrolling of said display in the specified direction at a second repetition rate for so long as said scrolling control key and said different one of said keys remain depressed.

49. A computer comprising a processor, memory means for storing program and data for said processor, input means for entering a plurality of inputs, and input interface means for coupling said input means to said processor, said input interface means comprising:

first means responsive to a first input entered through said input means for communicating said first input to an interactive program being executed in said processor to cause said processor to respond to said first input by performing a first action, as determined by said interactive program;

second means responsive to said first input and a second input entered through said input means for causing said processor executing said interactive program to repetitively perform said first action at a predetermined first repetition rate for so long as said first and second inputs are being entered; and third means responsive to said first input and second input and any one of a plurality of other inputs chosen from the plurality of inputs and entered through said input means for causing said processor executing said interactive program to repetitively perform said first action at a predetermined second repetition rate for so long as said first and second, and said any one of a plurality of other inputs are being entered, said plurality of other inputs having positions that are independent of and not relative to said first input or said second input and being inputs which are not dedicated.

50. A computer according to claim 49 wherein said memory means includes a BIOS program executed by said processor and said first, second and third means comprise one or more routines in said BIOS program.

51. A computer according to claim 49 wherein said memory means includes a terminate-and-stay-resident program executed by said processor and said first, second, and third means comprise one or more routines in said TSR program.

52. A computer according to claim 49 wherein said memory means includes an application program executed by said processor and said first, second and third means comprise one or more routines in said application program.

53. A computer according to claim 49 wherein said memory means includes an operating system program executed by said processor and said first, second and third means comprise one or more routines in said operating system program.

54. A computer according to claim 49 wherein said memory means includes a BIOS program and an operating system program executed by said processor and said first, second and third means comprise one or more routines in said BIOS program and said operating system program.

55. A computer according to claim 49 wherein said first, second and third means comprise hard-wired circuitry of said computer.

56. A computer according to claim 49 wherein said input interface means comprises a second processor executing an input interface program and said first, second and third means comprise one or more routines in said input interface program.

57. A computer according to claim 49 wherein said input means comprises a keyboard with a plurality of keys, and said first input is a depression of one of said keys, said second input is a prolonged depression of said one of the keys, and said any one of a plurality of other inputs is a subsequent concurrent prolonged depression of any other one of the plurality of keys.

58. A computer according to claim 49 and further comprising a display, wherein said input means comprises a keyboard having a plurality of keys, and wherein the keys include a cursor control key for moving a cursor on the display in a specified direction, the first means of said input interface means being responsive to a momentary depression of said cursor control key for causing the movement of said cursor on the display by one position in the specified direction, the second means of said input interface means being responsive to a prolonged depression of said cursor control key for causing the cursor on the display to repetitively move the cursor in the specified direction at the first repetition rate for so long as said cursor control key remains depressed, and the third means of said input interface means being responsive to a prolonged depression of said cursor control key and a concurrent prolonged depression of any other one of said plurality of keys for causing repetitive movement of said cursor on the display in the specified direction at a second repetition rate for so long as said cursor control key and said other one of said keys remain depressed.

59. A computer according to claim 49 and further comprising a display, wherein said input means comprises a keyboard having a plurality of keys, and wherein the keys include a scrolling control key for scrolling the display in a specified direction, the first means of said input interface means being responsive to a momentary depression of said scrolling control key for causing the scrolling of said display by one position in the specified direction, the second means of said input interface means being responsive to a prolonged depression of said scrolling control key for causing scrolling of said display repetitively in the specified direction at the first repetition rate for so long as said scrolling control key remains depressed, and the third means of said input interface means being responsive to a prolonged depression of said scrolling control key and a concurrent prolonged depression of any other one of said plurality of keys for causing repetitive scrolling of said display in the specified direction at a second repetition rate for so long as said scrolling control key and said other one of said keys remain depressed.

60. In an interactive computer system having an input means for entry of a plurality of operator inputs and performing actions in response to said operator inputs, a method for repeating said actions at a variable rate comprising the steps of:

responding to a first operator input by performing a first action corresponding to said first operator input;

responding to a second operator input concurrent with said first operator input by performing said first action at a predetermined first repetition rate; and responding to a third operator input concurrent with said first and second operator inputs by performing said first action at a predetermined second repetition rate, said third operator input being any one of said plurality of operator inputs other than the first and second operator inputs, and said third operator input having a position that is independent of and not relative to said first operator input or said second operator input and being an input which is not dedicated.

61. The method of claim 60 further comprising the step of setting a variable to indicate whether said second and third inputs are being received.

62. The method of claim 61 wherein said variable is a pointer into an array containing values indicative of said first and second repetition rates.

63. The method of claim 60 wherein said input means comprises a keyboard with a plurality of keys, and said first input is a depression of one of said keys, said second input is a prolonged depression of said one of the keys, and said third input is a subsequent concurrent prolonged depression of any other one of said plurality of keys.

64. The method of claim 60 wherein said input means comprises a keyboard with a plurality of keys, said first input is a depression of a first sequence of keys including a last key, said second input is a prolonging of the depression of said last key, and said third input is a subsequent concurrent prolonged depression of any one of said plurality of keys, other than said last key.

65. The method of claim 60 wherein said interactive computer system further comprises a display, said input means comprises a keyboard having a plurality of keys, and the keys include a cursor control key for moving a cursor on the display in a specified direction, the first recited responding step comprising being responsive to a momentary depression of said cursor control key for causing the movement of said cursor on the display by one position in the specified direction, the second recited responding step comprising responding to a prolonged depression of said cursor control key for causing the cursor on the display to repetitively move the cursor in the specified direction at the first repetition rate for so long as said cursor control key remains depressed, and the third recited responding step comprising responding to a prolonged depression of said cursor control key and a concurrent prolonged depression of any other one of said plurality of keys for causing repetitive movement of said cursor on the display in the specified direction at a second repetition rate for so long as said cursor control key and said any other one of said plurality of keys remain depressed.

66. The method of claim 60 wherein said interactive computer system further comprises a display, said input means comprises a keyboard having a plurality of keys, and the keys include a scrolling control key for scrolling the display in a specified direction, the first recited responding step comprising responding to a momentary depression of said scrolling control key for causing the scrolling of said display by one position in the specified direction, the second recited responding step comprising responding to a prolonged depression of said scrolling control key for causing scrolling of said display repetitively in the specified direction at the first repetition rate for so long as said scrolling control key remains depressed, and the third recited responding step comprising responding to a prolonged depression of said scrolling control key and a concurrent prolonged depression of any one of said plurality of keys for causing repetitive scrolling of said display in the specified direction at a second repetition rate for so long as said scrolling control key and said any one of said plurality of keys remain depressed.

* * * * *